US006651715B2

(12) United States Patent
Kato

(10) Patent No.: US 6,651,715 B2
(45) Date of Patent: *Nov. 25, 2003

(54) PNEUMATIC RADIAL TIRES FOR TRUCK AND BUS MOUNTED ON 15° DROP CENTER RIM

(75) Inventor: Kenshiro Kato, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 10/002,203

(22) Filed: Dec. 5, 2001

(65) Prior Publication Data

US 2002/0079038 A1 Jun. 27, 2002

Related U.S. Application Data

(62) Division of application No. 09/500,444, filed on Feb. 9, 2000, now Pat. No. 6,345,657, which is a division of application No. 08/757,942, filed on Nov. 27, 1996, now Pat. No. 6,044,885.

(30) Foreign Application Priority Data

Nov. 29, 1995 (JP) ............................................... 7-310424
Jan. 24, 1996 (JP) ............................................... 8-10401
Oct. 30, 1996 (JP) ............................................... 8-288713

(51) Int. Cl.⁷ ........................ B60L 15/00; B60L 15/024; B60L 15/04
(52) U.S. Cl. ........................ 152/540; 152/539; 152/544; 152/547
(58) Field of Search ................................. 152/544, 539, 152/540, 547, 541

(56) References Cited

U.S. PATENT DOCUMENTS 6,044,885 A * 4/2000 Kato ........................... 152/540

* cited by examiner

Primary Examiner—Adrienne C. Johnstone
(74) Attorney, Agent, or Firm—Sughrue Mion, PLLC

(57) ABSTRACT

In a pneumatic radial tire for trucks and buses mounted on an approved 15° drop center rim, an outer surface portion of a composite side-rubber and/or an envelope surface of the bead core among members constituting the bead portion of the tire has a curved shape concavedly directed toward the outside of the tire at a region opposite to an inner curved surface of a slantly rising portion in a flange of the approved rim.

1 Claim, 23 Drawing Sheets

FIG_1

FIG_2

FIG_3

FIG_5

FIG_6

FIG_7

FIG_8

FIG_10
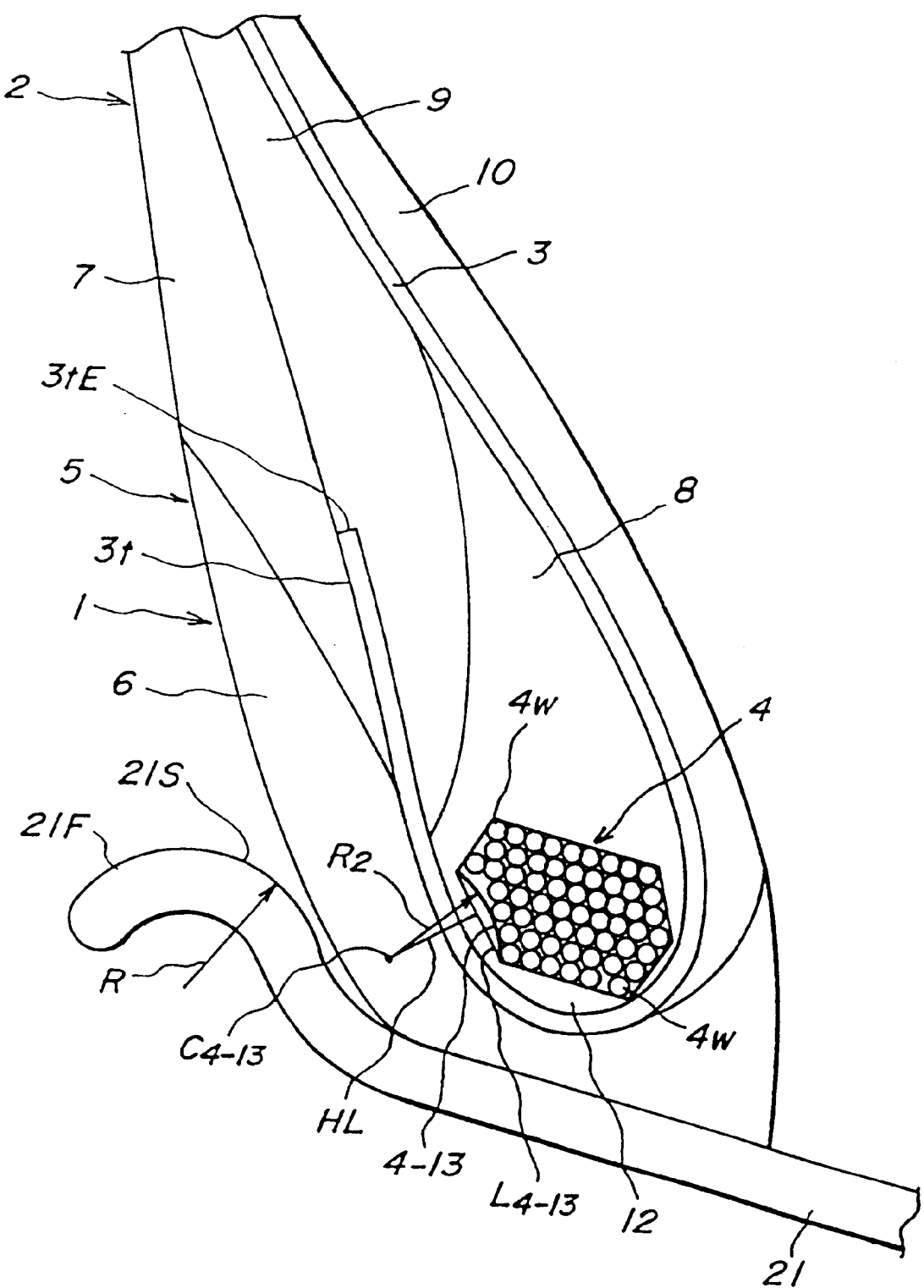

FIG_11
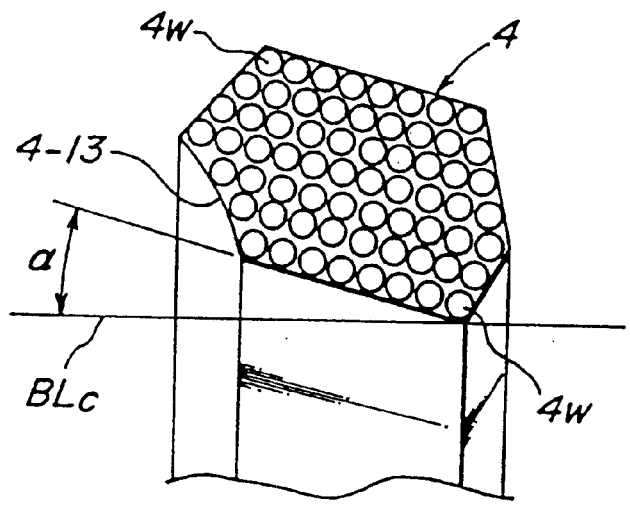
FIG_12
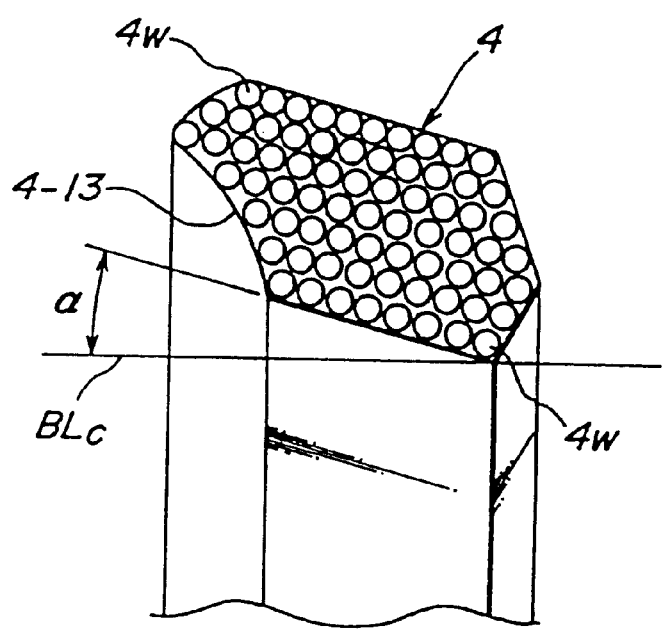

FIG. 16
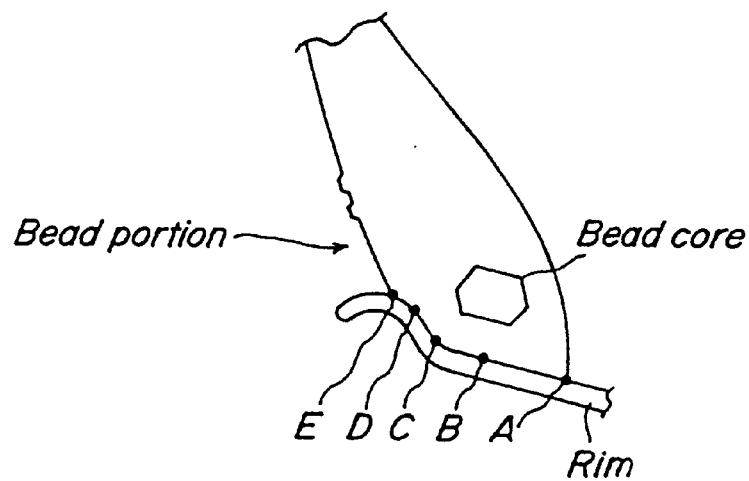
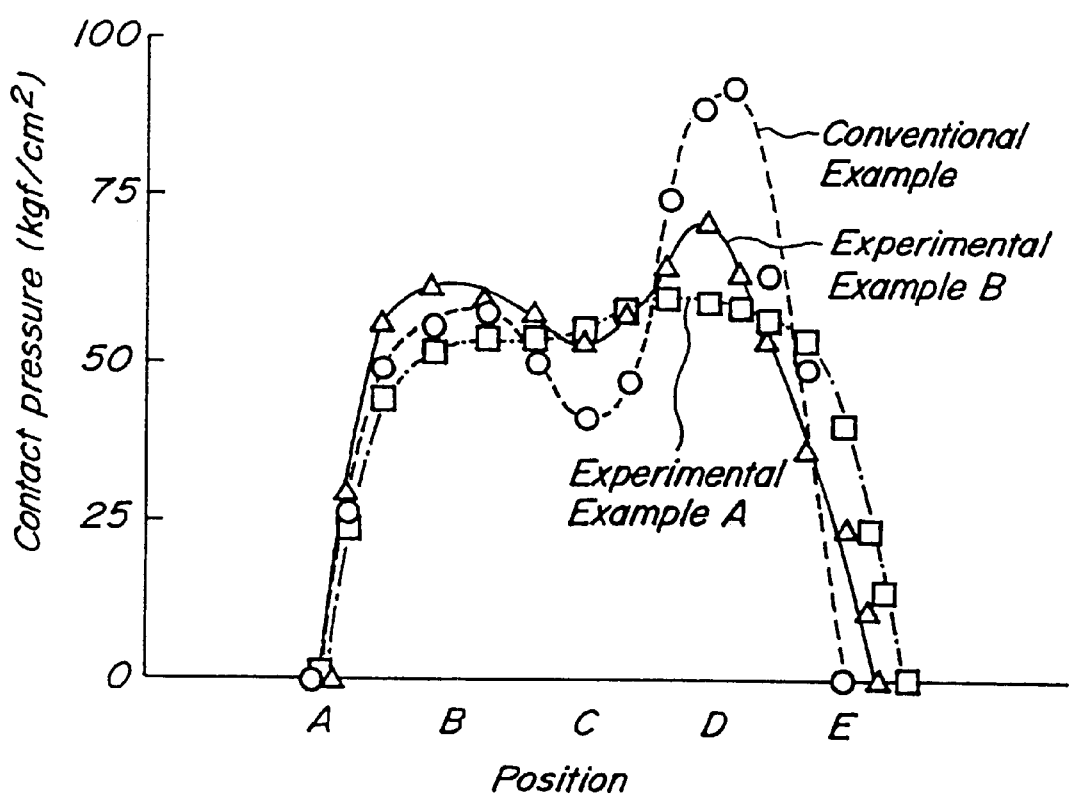

FIG_17

FIG_18

FIG_19

FIG_23
PRIOR ART
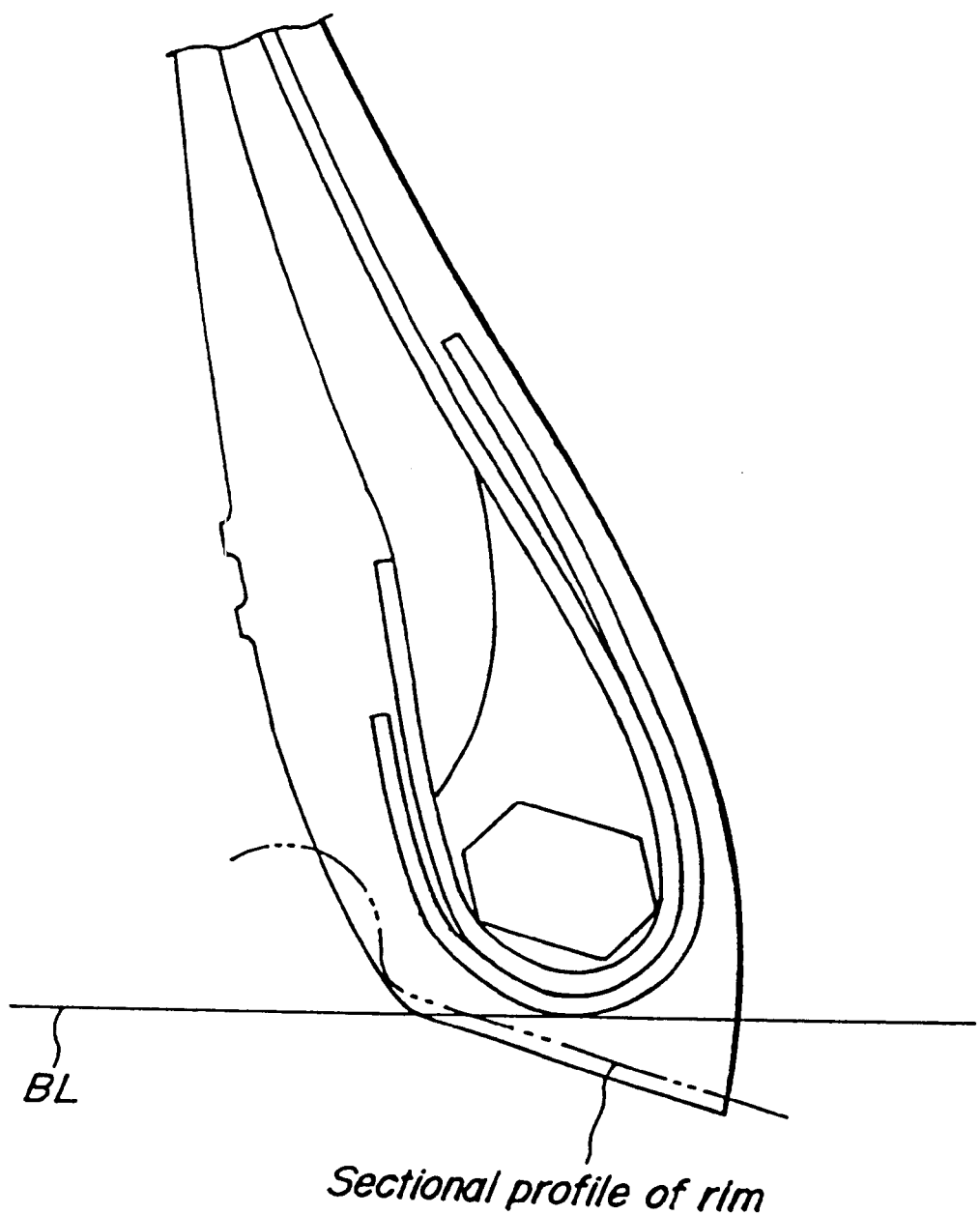
BL
Sectional profile of rim

FIG_24
PRIOR ART
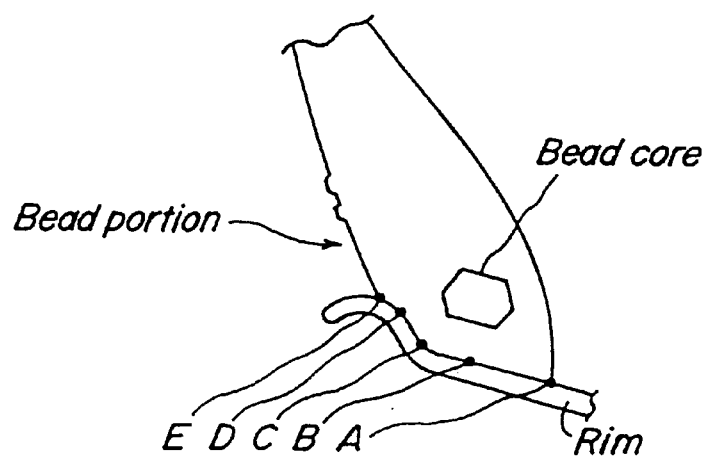
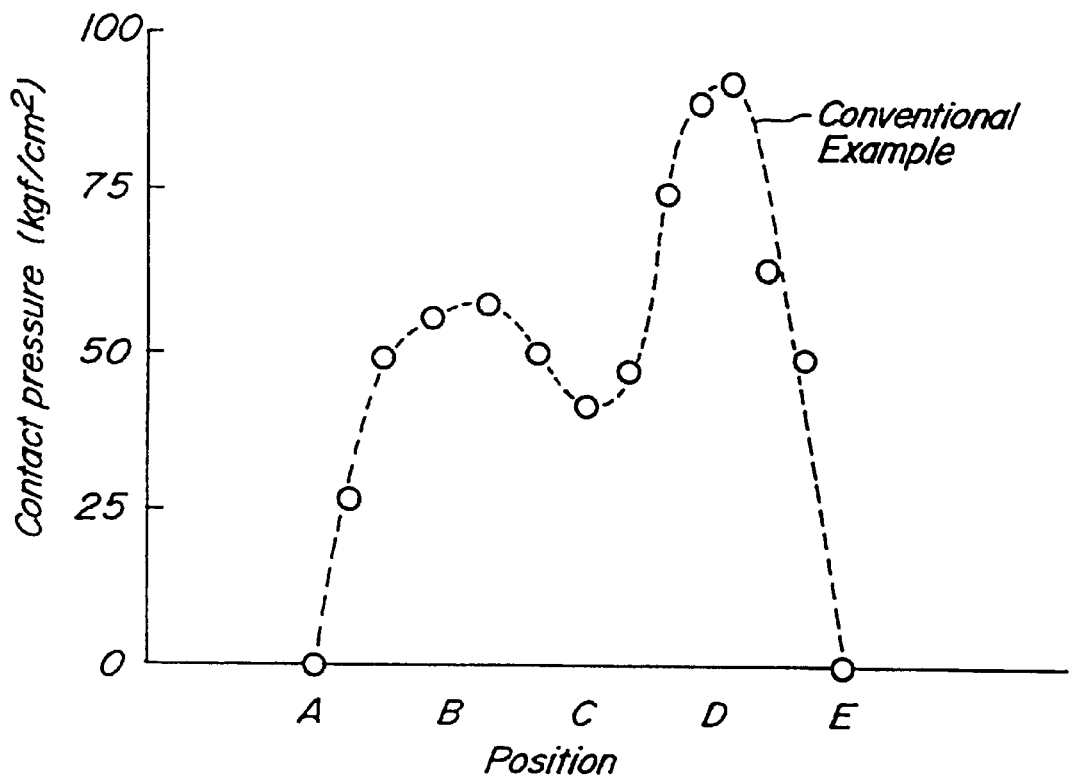

PNEUMATIC RADIAL TIRES FOR TRUCK AND BUS MOUNTED ON 15° DROP CENTER RIM

This is a divisional of application Ser. No. 09/500,444 filed Feb. 9, 2000, now U.S. Pat. No. 6,345,657 which is a Divisional Application of U.S. application Ser. No. 08/757,942 filed Nov. 27, 1996, now U.S. Pat. No. 6,044,885; the above noted prior applications are all hereby incorporated by reference.

BACKGROUND OF THE INVENTION

1. Field of the Invention

This invention relates to pneumatic radial tires for truck and bus mounted on 15° drop center rims (hereinafter abbreviated as 15° taper radial tire). More particularly it relates to a tubeless pneumatic radial tire for truck and bus adaptable to a drop center rim having a 15° tapered bead seat (15° drop center rim). Especially, the invention is concerned with a 15° taper radial tire for truck and bus having advantageously improved durability of a bead portion by rationalizing an outer profile and a constituting material shape of the bead portion engaging with a flange of a rim.

2. Description of Related Art

As mentioned above, the 15° taper radial tire for truck and bus is a tubeless (T/L) tire. In order to directly mount the tire of this type on a one-piece mold rim 21 having a section profile as shown in FIG. 20, there is applied a drop center rim (hereinafter referred to as 15° drop center rim) in which a height of a flange 21F is made considerably lower than that of a width-wide flat base rim having a section profile shown in FIG. 21. Owing to the peculiar section profile of this flange, a bead portion of the T/L tire for truck and bus considerably differs from a bead portion of a tubed (W/T) tire to be mounted on the width-wide flat base rim. Further, the T/L tire is characterized by having a structure that a taper of about 15° is applied to a bead base of the bead portion so as to match with a taper of 15°±1° formed on the bead seat of the rim 21 for ensuring air tightness and at the same time a given interference is applied to the bead portion.

As seen from the above description, although both the W/T tire and the T/L tire for truck and bus are used under the same heavy loading condition, a great difference in external force applied to the bead portion during the running under the heavy loading is naturally caused between both the tires. Because, the T/L tire having a lower height of the flange 21F becomes more unfavorable for fixation of the tire to the rim and the fall quantity of the bead portion toward the outside of the tire becomes larger as compared with that of the W/T tire. As the fall quantity increases, it is needless to say that problems with the bead portion are apt to be caused. Furthermore, with the WIT tire for truck and bus is difficult to attain automation in the mounting onto the rim, while the T/L tire is made possible to easily assemble on the rim by means of an automatic assembling device. As a result, the use of the T/L tire becomes more popular.

Therefore, various countermeasures as mentioned below have been taken up to the present time in order to improve the durability of bead portion in the T/L tire preventing the occurrence of bead portion trouble. These countermeasures are roughly divided into means for improving the rigidity of the bead portion and means for rationalizing the arrangement and shape of various cord layers extended from the bead portion to the sidewall portion.

As the former means for improving the rigidity, there are proposed (1) an increase of bead portion volume and additional arrangement of bead portion reinforcing cord layer, particularly means for the former volume increase in which since the bead core plays a basic role, a bead core having a low sectional height and a wide sectional width is arranged in correspondence with the low flange height of the aforementioned rim and a hard stiffener rubber extending taperedly outward in the radial direction of the tire is arranged from an outer peripheral surface of the bead core along a main body of a carcass ply to increase a volume of this rubber occupied in the bead portion as far as possible, (2) means for rendering an inner peripheral surface of a bead core having a flat and tetragonal section or a bead core having a flat and hexagonal section as mentioned in detail below into a tapered surface substantially matched with the surface of 15° tapered bead seat to more strengthen the engagement of the bead portion with the rim, and the like.

As the latter means for rationalizing the arrangement and shape of the cord layer, there are proposed (3) means for adjusting heights of a turnup end position of a radial carcass ply and an end position of a bead portion reinforcing cord layer, or means for adjusting positions of these ends in the widthwise direction of the tire, (4) means for mitigating stress at an end portion of rubber surrounding the above ends, (5) means for rationalizing a radial carcass line (a line of thickness center of the main body of the carcass ply other than the turnup portion thereof), and the like.

All of the above means for improving the durability of bead portion have developed effects as they were. However, the above conventional means and their extensions become no longer impossible to cope with the present circumstances such as more long-lived tire performance, increase of demands for the formation of a recapped tire after the tread rubber is worn, severer demands for weight reduction and the like.

Particularly, the increase of the bead portion volume and the additional arrangement of the bead portion reinforcing cord layer are inappropriate for weight reduction. Furthermore, the excessive volume increase and additional arrangement bring about a greater amount of heat generation during the running of the tire under the heavy loading and hence the inside of the bead portion becomes a high temperature. Such a high temperature brings about the rubber deterioration and the adhesion degradation, whereby separation failure is apt to be caused from cracking at the turnup end portion of the carcass ply or the end portion of the bead portion reinforcing cord layer. Further, when the tire is used under condition of such a high temperature over a long period, the rationalization of the arrangement and shape of the cord layer with much effort is damaged by a large creep deformation of rubber as mentioned later and hence the given object can not be attained. Also, the shape of the carcass line is lost to bring about degradation of the steering stability.

Even when the increase of bead portion volume and the additional arrangement of bead portion re-inforcing cord layer are within adequate ranges, the T/L radial tire for truck and bus mounted on the rim having a low flange height is naturally required to ensure a volume of the bead portion sufficiently durable to the heavy loading. When the tire having such a bead portion structure was run over a considerably longer distance such as 100,000 km, it has been confirmed that the bead portion creates a large creep (plastic) deformation as a whole. The state of this deformation is partially and sectionally shown in FIG. 22.

FIG. 22 is a section view of a main part of the bead portion when an assembly of T/L radial tire having a tire size of 11R22.5 and a rim is inflated under an internal pressure of 7 kgf/cm² (under no load), in which a portion shown by a solid line is a new tire and a portion shown by a broken line is a tire after actual running over 100,000 km. As seen from FIG. 22, the bead portion after the running over 100,000 km creates a non-restoring creep deformation directed toward the outside of the tire.

In the tire after running (portion shown by the broken line), the hexagonal bead core causes a large shape lose and moves in a direction shown by arrows and hence the carcass ply and its turnup portion are largely pulled out in a direction shown by arrows therealong. Such a large pulling-out phenomenon always causes a large shearing strain represented by a lozenge at both sides of the turnup end portion in FIG. 22. As a result that the above large shearing strain under the inflation of internal pressure simultaneously acts together with shearing strain produced in the turnup end portion during the running under the heavy loading, a crack is first created at the turnup end portion and grows into the separation failure as the running distance becomes long. Therefore, even if it is intended to rationalize the aforementioned means for improving the durability of the bead portion, the sufficient bead portion durability can not be realized.

SUMMARY OF THE INVENTION

It is, therefore, an object of the invention to provide pneumatic radial tires for truck and bus mounted on 15° drop center rim which can maintain adequate arrangement and shape of bead portion reinforcing cord layer inclusive of a carcass line while controlling is excessive increase of bead portion volume and holding weight reduction without extra additional arrangement of the bead portion reinforcing cord layers and suppressing temperature rise in the inside of the bead portion during the running under heavy loading as far as possible, and can properly control the creep deformation of the bead portion to considerably improve the bead portion durability concerning with cracks at the turnup end portion of the carcass ply or the end portion of the cord layer and separation accompanied therewith and hold the expected excellent steering stability.

According to a first aspect of the invention, there is the provision of pneumatic radial tire for truck and bus use mounted on an approved 15° drop center rim comprising a pair of bead portions, a pair of sidewall portions, a tread portion, at least one carcass ply extending between bead cores embedded one in each bead portion so as to reinforce these portions, the at least one carcass ply being reinforced with cords radially arranged therein and wound around the bead core from the inside of the tire toward the outside thereof to form a turnup portion in each bead portion and a main body therebetween, each Of said bead cores being a wound laminate of steel wire having a round or tetragonal polygonal shape in cross section, a belt superimposed on an outer periphery of the at least one carcass ply to reinforce the tread portion and comprised of two or more cross steel cord layers and a composite side-rubber extending from a bead base of each bead portion through an outside of the bead portion to a tread rubber of the tread portion and consisting of a rubber chafer and a sidewall rubber, wherein an outer surface portion of at least the composite side-rubber among members constituting each bead portion of the tire has a curved shape concavedly directed toward the outside of the tire at a region opposite to an inner curved surface of a slantly rising portion in each flange of the approved rim.

The bead portion of the conventional 15° taper radial tire for truck and bus use comprises a bead base having a given interference to a bead Beat of the rim for holding air tightness as T/L tire when the tire is mounted onto a 15° drop center rim and inflated under a given internal pressure, and has an outer surface portion giving a given interference to the flange of the rim. These interferences serve to strongly fix the bead portion to the rim in addition to the maintenance of air tightness. As the section of the bead portion in the conventional tire is shown in FIG. 23 together with a section profile of the rim shown by phantom line, the latter interference is attained by forming an outer surface of a composite side-rubber located at a position of contacting and engaging with the flange with an arc convexedly extending toward the outside of the tire and having a relatively large radius of curvature.

When the conventional T/L tire is mounted onto an approved rim and inflated under a high internal pressure defined in JATMA or TRA such as 8.00 kgf/cm² as a cold inflation pressure for tire size of 11R22.5 (110, 120 PSI in TRA), the convex arc portion of the composite side-rubber is deformed along the inner curved surface of the flange (concave curved surface directing toward the outside of the tire) by such an inflated internal pressure and hence a large contact pressure is applied to such a deformed portion. In FIG. 24 is shown a distribution state of contact pressure at positions A–E of the bead portion with the rim in the conventional tire having the above tire size. The position D corresponds to a position indicating a maximum deformation quantity and is under an influence of the contact pressure considerably larger than those in the other positions. Moreover, the contact pressure distribution shown in FIG. 24 is obtained under a cold inflation pressure of 7.0 kgf/cm², so that when the tire is actually run under loading, the internal pressure is raised to about 1.2–1.4 times the cold inflation pressure by a greater quantity of heat generation and also the outward flexing of the bead portion under loading is added. As a result the contact pressure distribution at the state of use is largely shifted toward the side of high contact pressure as compared with that shown in FIG. 24.

When the tire is run under loading, the composite side-rubber of the bead portion in a region contacting with the flange of the rim repeats such a motion that the rubber shrinks in the radial direction of the tire and along the circumferential direction of the tire at a zone of the tread contacting with ground and restores to original state at a zone kicking out from the ground contact zone. Since this motion is a relative motion to the flange of the rim, the quantity of heat generation based on hysteresis loss becomes larger at a position that the contact pressure becomes higher. A part of heat generated is released to the exterior through the rim, while the remaining greater quantity of heat generated is stored in the rubber portion known to be a poor conductor of heat and the stored heat is gradually diffused to finally render the bead portion into a high temperature.

When such a high-temperature state is held over a long period of time, the creep deformation is caused in rubber. Although the region of the bead portion other than the composite side-rubber is naturally rendered into a high temperature through heat generation through hysteresis loss being a viscoelastic property inherent to rubber based on amplitudes of internal strain and internal stress produced by the repetition of loading and its release during the running of the tire, the heat generation produced in the composite side-rubber under a high contact pressure to the flange particularly contributes to the occurrence of creep deformation. Furthermore, the composite side-rubber located under the high contact pressure prematurely causes the wearing and finally wears up to a shape extending along the flange of the rim, which is so-called rim chafing phenomenon. That is, bead portion exposed to the high temperature over a long period of time causes creep deformation to a shape shown by a broken line in FIG. 22 together with the above rim chafing.

In creep deformation, the shifting, deformation and shape loss of the beat core damage the function inherent to the bead portion in that cord layers such as carcass ply and the like are closely fixed between the bead core and the bead seat of the rim. Therefore, the fixed state of cords in the carcass ply bearing the high internal pressure is slackened and finally the pulling-out of the carcass ply as previously mentioned in FIG. 22 is apt to be caused. As a result, a large shearing strain is produced in the turnup end portion of the carcass ply to create a breaking nucleus in a boundary face between the cord and the rubber surrounding the cords, which progresses in the occurrence of failure from cracks to separation. In this point, it can be said that the shifting, deformation and shape losing of the bead core considerably and badly affect the durability of the bead portion.

The steel wire constituting the bead core has a circular or tetragonal shape at section. The former circular shape includes a complete circle and an oval shape near to the circle, while the latter tetragonal shape includes a complete tetragon as well as a lozenge, tetragon provided with four rounded corners, tetragon provided with a small protrusion and the like. Further, the wiring lamination of such a steel wire may be carried out by various shaping methods. As an example of these methods, a single long steel wire is spirally wound side by side to form an innermost peripheral portion and further spirally wound on the innermost peripheral portion side by side riding on the each wound steel cord constituting the innermost peripheral portion and then such a procedure is repeated to form a wound laminate of the steel cord. As another example, a plurality of ring-shaped wires may be gathered side by side in horizontal and vertical directions to form a wound laminate. Moreover, an inner peripheral surface of the bead core is desirable to have a taper of about 15° with respect to a bead base line parallel in the same plane as a rim diameter line mentioned later viewing at a section of the bead core.

On the contrary, when the outer surface portion of at least composite side-rubber among members constituting the bead portion of the tire are rendered into a curved shape concavedly directing toward the outside of the tire at a region opposite to an inner curved surface of a slantly rising portion in the flange of the approved rim, the composite side-rubber contacting with the flange of the rim is possible to obtain an even contact pressure distribution to the inner curved surface of the flange under not only a high internal pressure but also a heavy loading, which controls the aforementioned creep deformation to a minimum and particularly develops the effect of effectively suppressing the shifting, deformation and shape losing of the bead core. As a result, it is possible to largely reduce the shearing strain acting to the turnup end portion of the carcass ply and the durability of the bead portion can considerably be improved.

In order to further enhance the above effect, it is effective that the concavedly curved surface of the composite side-rubber is located between a bead base line and a first straight line passing through a radially outer surface of a steel wire located at an outermost side of the bead core in the radial direction of the tire and being parallel to the bead base line and a curve appeared in the concavedly curved surface of the composite side-rubber at a section of the tire is comprised of plural arc segments smoothly connecting to each other and having a peak in one of these segments, and the peak is located between the first straight line and a second straight line passing through an innermost side of the turnup portion of the carcass ply around the bead core in the radial direction of the tire and parallel with the bead base line.

The term "bead base line" used herein means a straight line passing through an intersect between an extension line of the bead base and a straight line concaved with a line of an outer surface contour of a bead heel portion and perpendicular to a rotating axial center of the tire, and being parallel with the rotating axial center of the tire in the section of the tire.

In order to control creep deformation, it is practically effective that the concavedly curved surface of the composite side-rubber is formed so that a radius of curvature $R_1$ of an arc segment having the peak among the arc segments constituting the concavedly curved surface and a radius of curvature R of a major inner curved surface in the flange at a section of the approved rim satisfy a relationship of $0.4 \times R \leq R_1 \leq 1.6 \times R$.

Further, it is practically desirable that when a hypothetic arc convexedly extending toward the outside of the tire at section of the tire is pictured to pass through a first intersect between the first straight line among both the straight lines and an outer contour line of the bead portion and a second intersect between the bead base line and a surface contour line of the bead heel portion perpendicular to the bead base line and smoothly connect to the outer contour line in the vicinity of the first intersect, a distance D between the peak and the hypothetic arc as measured on a normal line passing through the peak toward the hypothetic arc is within a range of 22–70% of a distance d between the hypothetic arc and a position of the turnup portion of the carcass ply located on the normal line.

The tire according to the invention includes a case of no bead portion reinforcing cord layer and a case of using a bead portion reinforcing cord layer. The former case is enough to take the constructions as mentioned above. In the latter case, at least one reinforcing cord layer is piled on the outer surface of the carcass ply in the bead portion, and the distance D between the peak and the hypothetic arc as measured on the normal line passing through the peak toward the hypothetic arc is within a range of 22–70% of a distance d between the hypothetic arc and a position of an outermost bead portion reinforcing cord layer located on the normal line, whereby the occurrence of crack and separation at the turnup end portion of the carcass ply and the end portion of the bead portion reinforcing cord layer are simultaneously controlled.

In order to further enhance the effect of concavedly curved surface of the composite side-rubber, it is effective that a convex arc segment further projecting from the hypothetic arc toward the outside of the tire and having a peak is provided on an outer surface of the bead portion at at least one of inner side and outer side of the concavedly curved surface of the composite side-rubber in the radial direction of the tire to smoothly connect to the concavedly curved surface, and a distance L between the peak and the hypothetic arc as measured on a normal line passing through the peak toward the hypothetic arc is not more than 0.65 times of the distance D.

As another means for more enhancing the effect of concavedly curved surface of the composite side-rubber, it is effective that a convex arc segment having a peak located inward from the hypothetic arc and projecting toward the outside of the tire is provided on an outer surface of the bead portion at at least one of inner side and outer side of the concavedly curved surface of the composite side-rubber in the radial direction of the tire so as to smoothly connect to the concavedly curved surface, and a distance M between the peak and the hypothetic arc as measured on a normal line passing through the peak toward the hypothetic arc is within a range of 0.1–0.5 times of the distance D.

The above two formations of the convex arc segment may be applied separately or used together.

According to a second aspect of the invention, there is a provision of pneumatic radial tire for truck and bus use mounted on an approved 15° drop center rim comprising a pair of bead portions, a pair of sidewall portions, a tread portion, at least one carcass ply extending between bead cores embedded one in each bead portion to reinforce these portions, the at least one carcass ply being reinforced with cords radially arranged therein and wound around the bead core from the inside of the tire toward outside thereof to form a turnup portion in each bead portion and a main body there between, each of said bead cores being a wound laminate of steel wire and having a round or a polygonal shape in cross-section, a belt superimposed on an outer periphery of the at least one carcass ply to reinforce the tread portion and comprised of two or more cross steel cord layers, and a composite side-rubber extending from a bead base of each bead portion through an outside of the bead portion to a tread rubber of the portions and consisting of a rubber chafer and a sidewall rubber, wherein an envelope surface of the bead core among members constituting each bead portion of the tire has a curved shape concavedly directed toward the outside of the tire at a region opposite to an inner curved surface of a slantly rising portion in each flange of the approved rim.

The tire according to the second aspect of the invention has an arrangement of the beat core that an envelop surface among plural envelop surfaces constituting the outer envelop line of the polygonal shape at the section of the bead core is located so as to be opposite to the inner curved surface of the flange in the approved rim. In, this tire, the envelop surface for steel wires of the bead core opposite to the inner curved surface of the flange in the approved rim is rendered into a curved shape concavedly directing toward the outside of the tire, whereby it is made possible to control the deformation and shape losing of the bead core through the creep deformation and also to strongly push the carcass ply between the inner peripheral surface of the bead core and the bead seat of the rim to effectively prevent the pulling-out of the carcass ply.

The polygonal shape of the outer envelop line at the section of the bead core means a triangle or more according to geometrical definition but generally indicates a tetragon or hexagon. However, the shape of the bead core inside the tire is not necessarily maintained at an accurate polygonal shape, but is generally a shape somewhat shifting from a shape formed by connecting of line segments of n points to each other in turns. When the bead core is made from a steel wire having a circular section, an intersect between extension lines is adopted instead of the point because the point is not existent. The shaping of the bead core from the steel wire is carried out as previously mentioned. Here, the bead core having a hexagonal shape at section is explained with reference to FIG. 2. In the manufacture of the bead core 4 having a hexagonal section shown in FIG. 2, a single long steel wire 4w usually coated with rubber of a very thin thickness, for example, 0.01–0.02 mm in thickness is spirally wound side by side in a shaping mold of a concave form to form an innermost peripheral portion and thereafter the spiral winding side by side riding on each wound steel wire is repeated to form a bead core of a given shape as shown in FIG. 2. An outer envelop surface Ev of the bead core made from a group of gathered steel wires makes an envelop line of substantially an oblong hexagonal shape viewing at the section of the bead core, which is generally called as a hexagonal bead core. If such a bead core is subjected to shifting, deformation and shape loss, the hexagonal shape as a hexagonal bead core is no longer held. In FIG. 2, a straight line BLc is substantially parallel to the rim diameter line and bead base line, and an envelop surface line Ev of the innermost peripheral portion of the bead core has an inclination angle α of about 15° with respect to the straight line BLc parallel with the rim diameter line.

In order that the envelop surface of the bead core having the concavedly curved surface practically and effectively develops the effect of controlling the creep deformation likewise the aforementioned composite side-rubber, it is favorable that at least a central region of the concavedly curved surface in the envelop surface for steel wire at the section of the bead core is comprised of an arc with a radius of curvature $R_2$ having a curvature center located on a perpendicular bisector of a line segment connecting both ends of the central portion to each other so that the radius of curvature $R_2$ and a radius of curvature R in an inner curved surface of a flange in an approved rim satisfy a relationship of $0.7 \times R \leq R_2 \leq 1.2 \times R$.

In order more enhance the effect of controlling the creep deformation by the bead core, it is advantageous that a shape of the turnup portion of the carcass ply located along the concavedly curved surface in the envelop line for steel wire at the section of the bead core is comprised of one or more arcs having a curvature center located outside the tire. Further, it is favorable that a minimum radius of curvature $R_3$ among radii of curvature in the arcs forming the turnup portion of the carcass ply is within a range of 0.75–1.2 times of the radius of curvature R in the flange of the approved rim.

The tire using the bead core having the concavedly curved envelop surface according to the invention includes a case of using no bead portion reinforcing cord layer and a case of using a bead portion reinforcing cord layer. The former case is enough to take the constructions as mentioned above. In the latter case, at least one reinforcing cord layer is piled on the outer surface of the carcass ply in the bead portion along at least the turnup portion of the carcass ply, and has an arc-shaped portion along the arcs of the turnup portion so that a minimum radius of curvature $R_4$ among radii of curvature forming the arc-shaped portion simultaneously satisfies relationships of $R_4 \geq R_3$ and $R_4 \leq 1.65 \times R_3$ with respect to the aforementioned minimum radius of curvature $R_3$ and the radius of curvature R, whereby the occurrence of crack and separation at the turnup end portion of the carcass ply and the end portion of the bead portion reinforcing cord layer are simultaneously controlled.

Although the above has been described with separate formation of the concavedly curved surface in the composite side-rubber and the bead core, in order to control the creep deformation at minimum to more enhance the effectiveness of the tire according to the invention, it is desirable that both the composite side-rubber and the bead core are provided with the curved surfaces concavedly directed toward the outside of the tire on the outer surface portion of the composite side-rubber and the envelop surface for steel wire of the bead core opposite to the inner curved surface of the slantly rising portion in the flange of the approved rim.

In the tire according to the invention, in order to enhance the resistance to pulling-out of the carcass ply as far as possible, it is favorable that the tire is provided with a hard stiffener rubber tapered and extending outward from an outer periphery of the bead core along the main body of the carcass ply in the radial direction of the tire and a bead core wrapping rubber surrounding the bead core and a modulus at 100% elongation of the wrapping rubber $E_1$ is within a range of 0.75–1.20 times of a modulus at 100% elongation of the stiffener rubber $E_2$. The wrapping rubber has a tendency of gathering between the inner peripheral surface of the bead core and the carcass ply surrounding the bead core after the building-up of the tire through vulcanization at a high temperature under a high pressure and takes an important role for enhancing the fastening force of the carcass ply.

In order to require that the composite side-rubber having the concavedly curved surface has large resistances to creep deformation and rim chafing, it is desirable that a modulus at 100% elongation $E_3$ of at least a rubber portion having the concavedly curved surface in the composite side-rubber is within a range of 0.68–1.15 times of the modulus at 100% elongation of the hard rubber stiffener $E_2$.

In order to require that the steel wire of the bead core has a large resistance to creep deformation likewise the composite side-rubber, it is desirable that the steel wire constituting the bead core is provided at its periphery with a very thin coating rubber and a modulus of at 100% elongation of the coating rubber $E_4$ is not less than 0.45 times of the modulus at 100% elongation of the hard stiffener rubber $E_2$.

BRIEF DESCRIPTION OF THE DRAWINGS

The invention will be described with reference to the accompanying drawings, wherein:

FIG. 10 is a diagrammatically section view details of a bead portion in a second the tire according to the invention;

FIG. 11 is a partly perspective view sectionally of a modified embodiment of the hexagonal bead shown in FIG. 2;

FIG. 12 is a partly perspective view sectionally of another modified embodiment of the hexagonal core shown in FIG. 11;

FIG. 16 is a graph showing a contact pressure distribution of a bead portion engaged with a flange of a rim;

FIG. 23 is a diagrammatically section view of a bead portion in the conventional tire; and FIG. 24 is a graph showing a contact pressure distribution of a bead portion in the conventional tire engaged with a flange of a rim.

DESCRIPTION OF THE PREFERRED EMBODIMENTS

Figure 1:
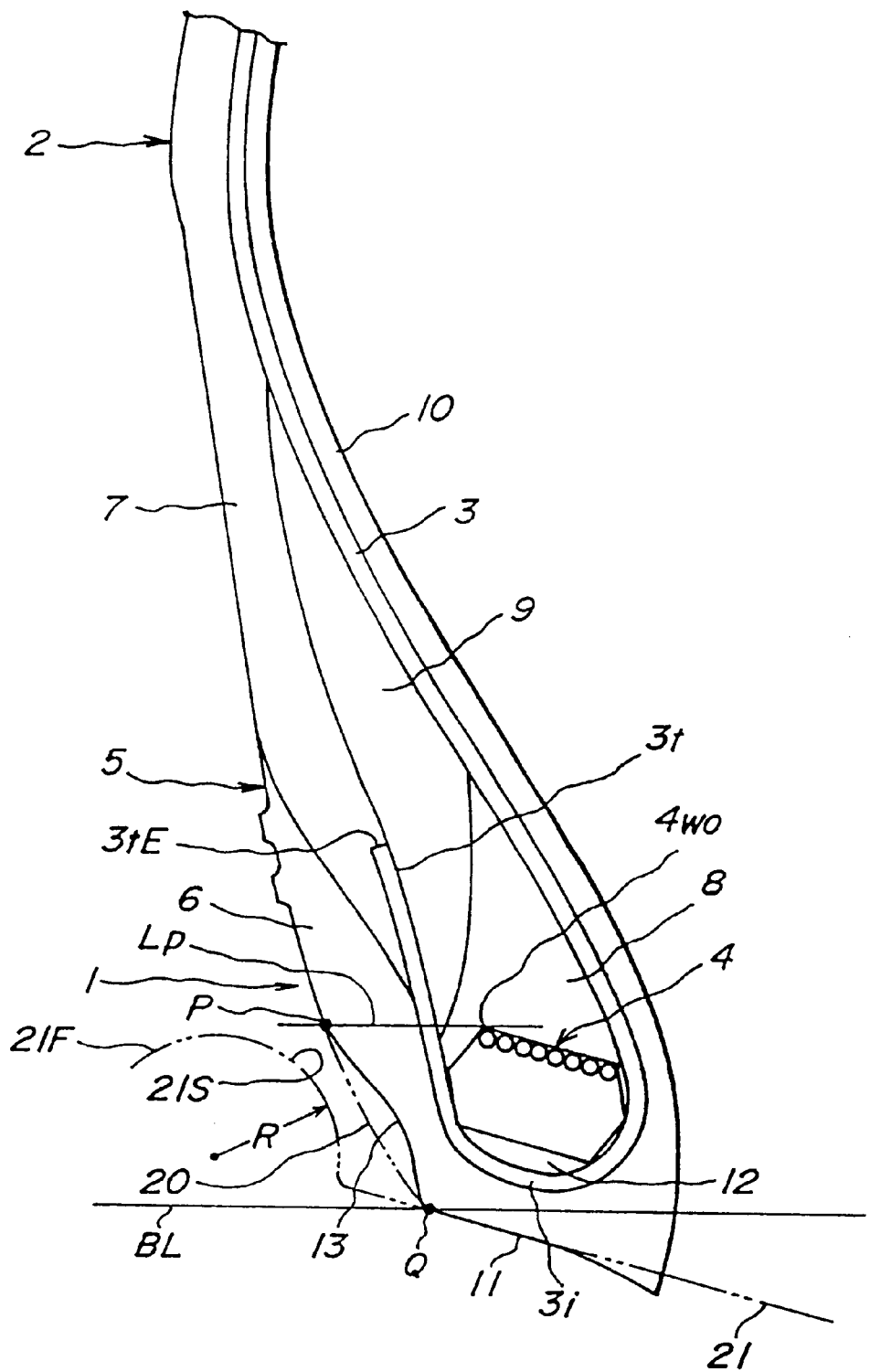
FIG. 1 is a diagrammatically section view of a main part of a first embodiment of the tire according to the invention.

The invention is divided into a group shown in FIGS. 1–9 and a group shown in FIGS. 10–15 with the exception of common portions and will be described with reference to the drawings.

FIGS. 1, 3–9, 10 and 13–15 sectionally show main parts of left sides of various embodiments in the pneumatic radial tire for truck and bus use mounted on a 15° drop center rim according to the invention (hereinafter abbreviated as T/L radial tire or tire simply), respectively. FIGS. 2, 11 and 12 sectionally show various embodiments of the bead core used in the invention, respectively.

According to custom, the T/L radial tire shown in FIGS. 1, 3–10 and 13–15 comprises a pair of bead portions 1 (showing only one-side bead portion), a pair of sidewall portions 2 (showing only one-side sidewall portion), a tread portion (not shown), at least one carcass ply 3 (one ply in the illustrated embodiment) toroidally extending between a pair of bead cores 4 embedded in the bead portions 1 to reinforce the bead portion 1, the sidewall portion 2 and the tread portion and containing rubberized cords of radial arrangement, and a belt (not shown) superimposed on an outer periphery of the carcass ply 3 and comprised of two or more cross steel cord layers. Although steel cords are used in the carcass ply 3 of the illustrated embodiment, organic fiber cords may also be used. For example, polyester cords may be applied in case of plural carcass plies, while aramide fiber cords may be applied in case of the single carcass ply.

The carcass ply 3 is wound around the bead core 4 from inside toward outside to form a turnup portion 3t. The bead portion 1 of the T/L radial tire is provided with a composite side-rubber 5 over a region ranging from a bead base of the bead portion along the outside of the tire toward a tread rubber (not shown) of the tread portion. The composite side-rubber 5 consists of a rubber chafer 6 and a sidewall rubber 7. Although the rubber chafer 6 in the illustrated embodiment is located toward the outside of the tire to envelop the sidewall rubber 7, the inner portion of the sidewall rubber 7 in the radial direction of the tire as a whole may be located outside the rubber chafer toward the outside of the tire as a modified embodiment.

Further, the rubber chafer 6 forms an inner peripheral portion of the bead portion 1 ranging from a heel region (in the vicinity of the position Q) through a bead base region 11 forcedly engaging with a bead seat of a 15° drop center rim to a toe region. The bead base region 11 forms an inner peripheral surface taperedly extending toward the inside of the tire, in which a taper angle is about 15° with respect to a bead base line BL.

Further, the T/L radial tire is provided with a hard stiffener rubber 8 tapered and extending outward from the outer peripheral surface of the bead core 4 along a main body of the carcass ply 3 (portion other than the turnup portion 3t) in the radial direction, a soft filler rubber 9 joining with the outer surface of the stiffener rubber 8 and extending outward along the inside of the turnup portion and the main body of the carcass ply in the radial direction, and an innerliner 10 extending between a pair of bead toe regions (showing only one-side bead toe region) inside the main body of the carcass ply 3 and made from an air impermeable rubber.

On the other hand, the bead core 4 is covered with a bead core wrapping rubber (not shown). This wrapping rubber mainly stands between the inner peripheral surface of the bead core 4 and the turnup portion of the carcass ply 3 corresponding to the position of this inner peripheral surface after vulcanization, and such rubber stand is represented by numeral 12 in FIGS. 1, 4 and 10.

The structure and usual production method of the bead core 4 are described with reference to FIG. 2 particularly showing a hexagonal section of the bead core. In FIG. 2, numeral 4w is a steel wire having substantially a circular section and a diameter of 0.9–2.2 mm. The bead core 4 is formed by wiring and laminating a single long steel wire obtained by coating the steel wire 4w with a very thin rubber having a thickness of about 0.01–0.20 mm. As an example of the production method, the single rubberized and unvulcanized steel wire is wound side by side from a left-side or right-side end of a lowest stage in FIG. 2 by a given number of windings and thereafter the wire is shifted on a stage located above the lowest stage and wound side by side, and such a winding operation is repeated up to a given number of stages. In this case, there is used a ring-shaped two-split type or size-reducing type device having a concave sectional shape which restricts both outer sides of a stage having greatest number of windings, i.e. a fourth stage in the illustrated embodiment and houses this stage therein, in which the steel wire 4w of an upper stage is wound between mutual steel wires 4w of a lower stage.

After the completion of the winding up to the fourth stage in the illustrated embodiment, the winding operation is carried out in the order of fifth, sixth and seventh stages at an opening state of the device. Moreover, the number of upper stages and the number of lower stages bordering the stage of greatest windings are not necessarily the same as far as the envelop line of the section of the bead core 4 forms substantially a hexagonal shape to provide six flat envelop surfaces Ev as the bead core 4. In this case, the inner peripheral surface of the bead core 4 used in the T/L radial tire is arranged at an inclination angle a of about 15° with respect to a straight line BLc passing through an inner edge of the steel wire at the right-side or left-side end (right-side end in the illustrated embodiment) of the innermost stage and parallel to the bead base line. The bead core 4 after the completion of the winding lamination may be fed to the tire building equipment at an uncured state because the steel wires are integrally united together by uncured tackiness of the very thin rubber, or may be subjected to a precuring step prior to the tire building steps.

Figure 2:
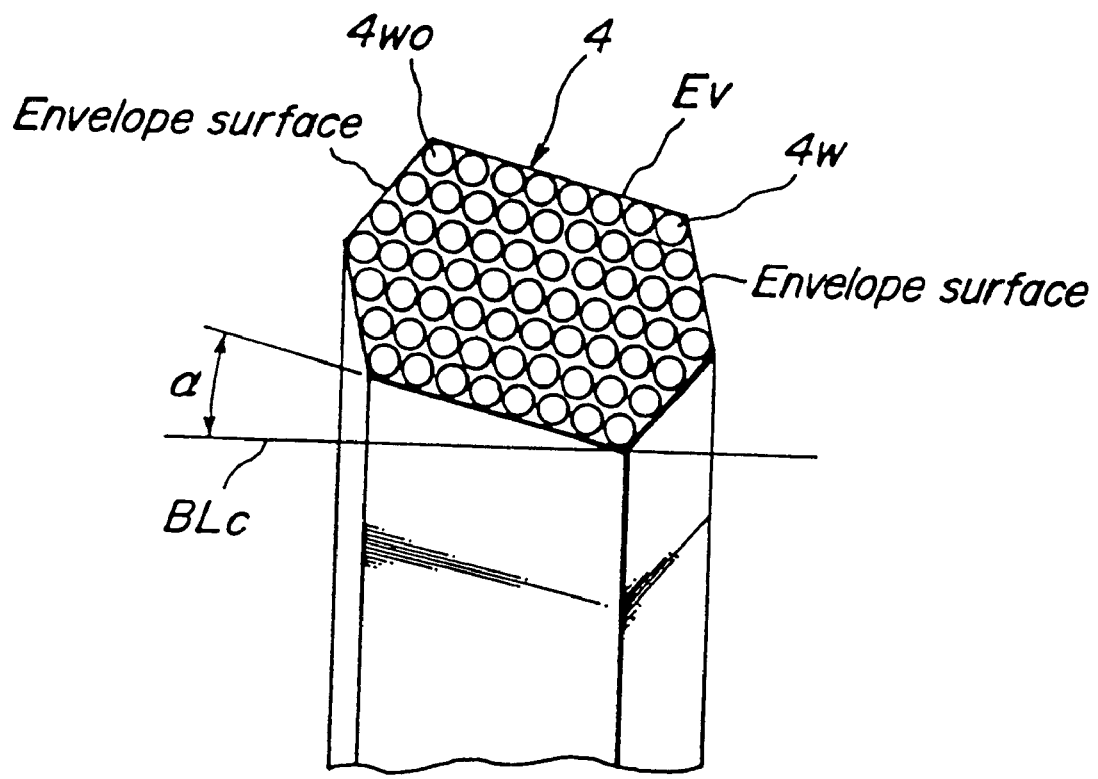
FIG. 2 is a partly perspective view sectionally shown of a hexagonal bead core.

The T/L radial tire is provided with a curved surface 13 convexedly directing toward the outside of the tire at an outer surface portion of at least composite side-rubber 5, particularly rubber chafer 6 in the illustrated embodiment among the members constituting the bead portion 1, i.e. composite side-rubber 5, turnup portion 3t and bead core 4 located opposite to a curved surface 21S of a slantly rising portion in a flange 21F of a rim 21 showing an inner section contour by a phantom line in FIG. 1. The curved surface 13 may be shaped by forming in a mold during vulcanization. Moreover, FIG. 1 shows a state just before the complete fitting of the tire to the rim 21.

Figure 17:
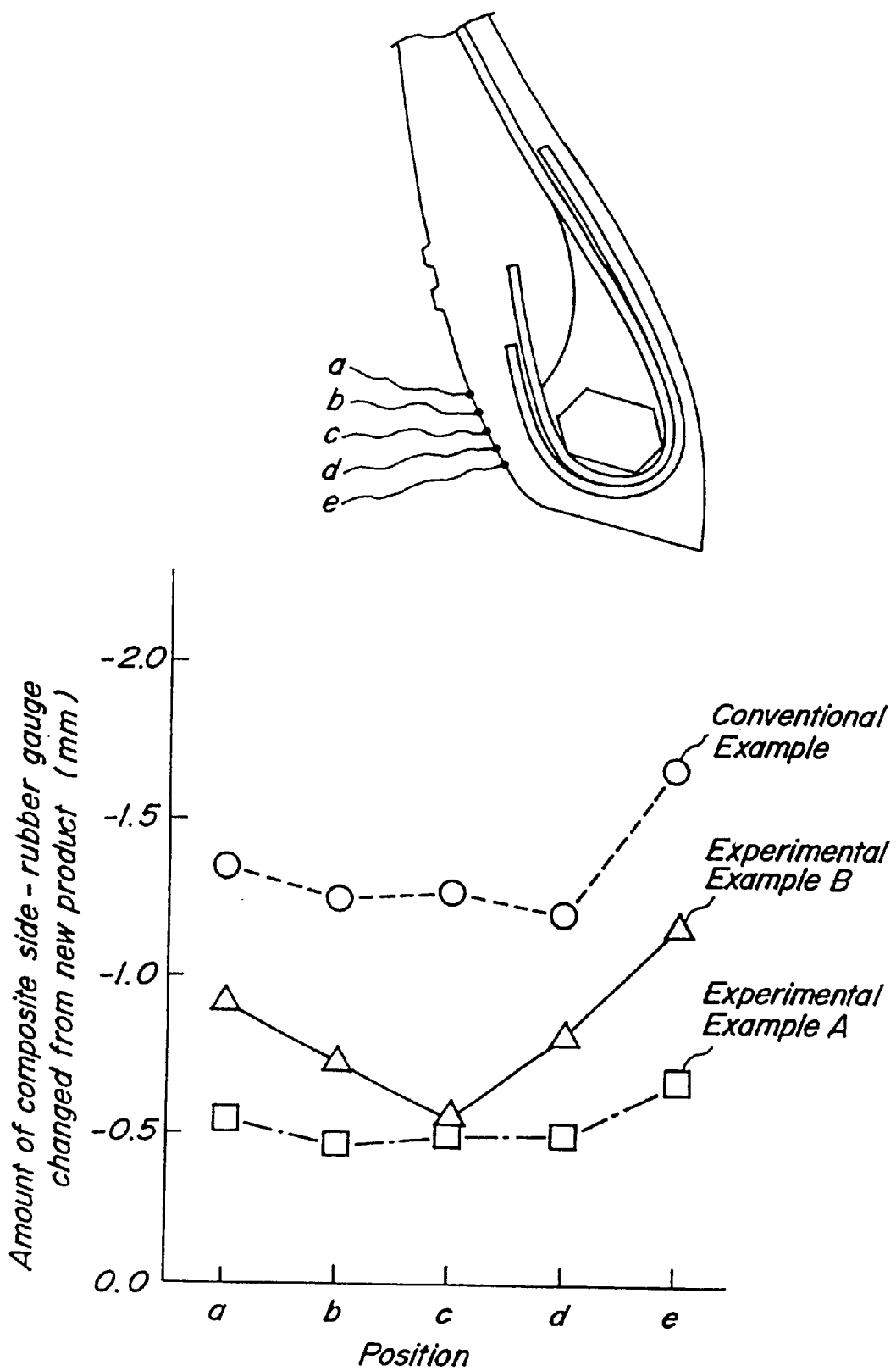
FIG. 17 is a graph showing a rubber gauge change of a composite side-rubber in a bead portion engaged with a flange of a rim.

The contact pressure distribution of the bead portion in each of Experimental Examples A and B having different curved surfaces 13 with respect to the curved surface 21S of the flange 21F is measured to obtain results as shown in FIG. 16 together with results of a conventional example having the same tire size (11R 22.5) and containing no curved surface. As seen from FIG. 16, the contact pressure distribution of each Experimental Example is considerably uniform as compared with that of the conventional example. After each tire of Experimental Examples A and B and the conventional example having the contact pressure distribution shown in FIG. 16 is mounted onto a truck and actually run over a distance of 100,000 km, it is unmounted from the rim and a gauge changing amount of the composite side-rubber 5 (rubber chafer 6) at the contact face with the flange 21F of the rim 21 is measured as a creep deformation amount to obtain results as shown in FIG. 17, in which the creep deformation amount becomes large as a minus value becomes large. From these results, it is apparent that the amount of contact pressure is inversely proportional to the creep deformation.

Figure 18:
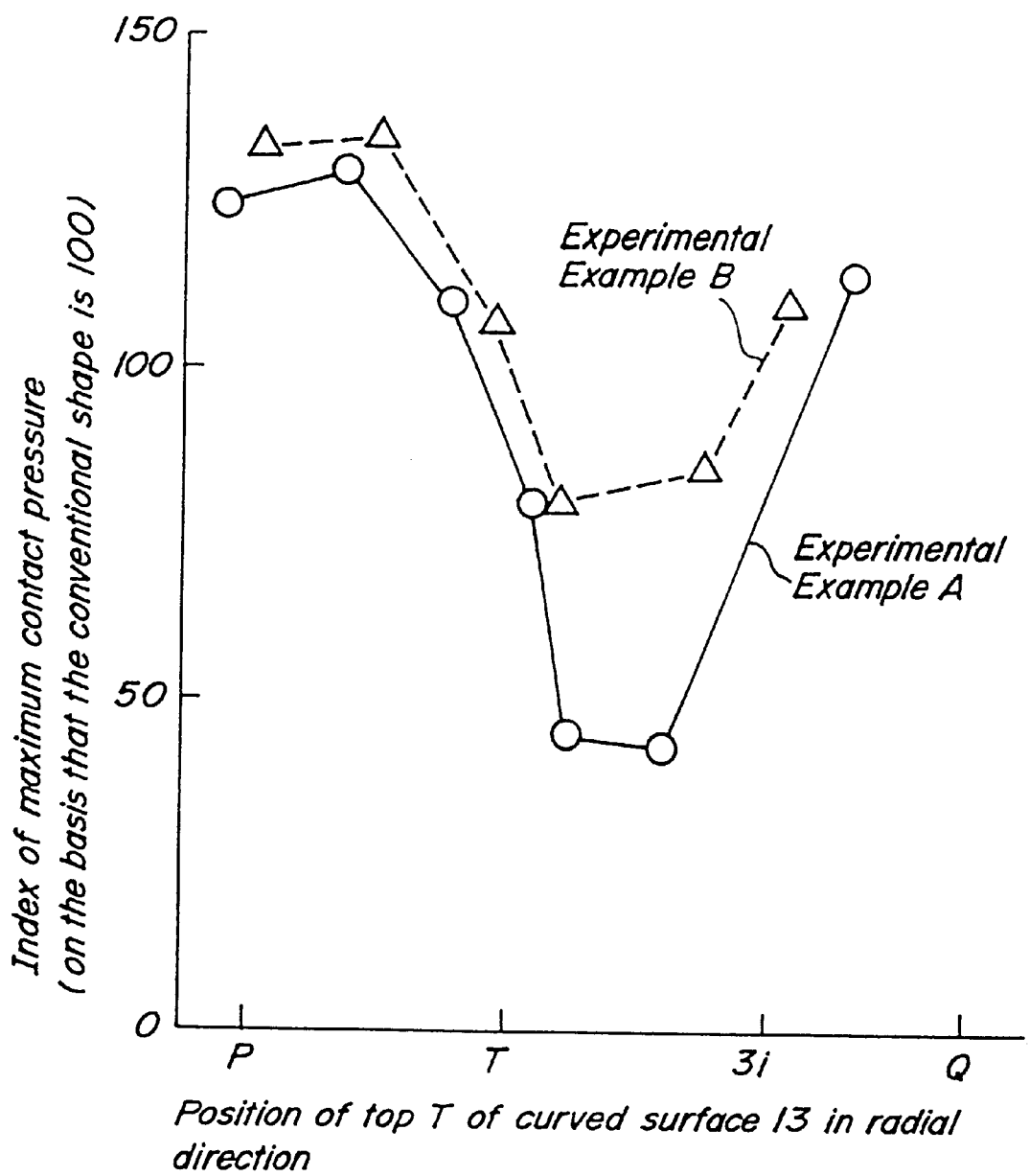
FIG. 18 is a graph showing a change of maximum contact pressure in a bead portion engaged with a flange of a rim.

The concavedly curved surface 13 is located between the bead base line BL and a first straight line Lp (see FIGS. 1, 3 and 4) passing through a radially outer surface of a steel wire 4wo (see FIGS. 1–4) located at an outermost side of the bead core 4 in the radial direction of the tire and being parallel to the bead base line BL. The concavedly curved surface 13 of the rubber chafer 6 is represented by a curve 13 at the section in each of these figures, which consists of plural arc segments smoothly connecting each other and convexedly directed toward the inside of the tire and a peak T is existent in the thus formed convex arc (see FIGS. 3 and 4). This peak T is located between the first straight line Lp and a second straight line (not shown) passing through an innermost position 3i of the turnup portion of the carcass ply 3 around the bead core 4 in the radial direction and being parallel to the bead base line BL. This is also confirmed from a fact that similar results are obtained by using T/L radial tires of Experimental Examples And B and Conventional Example having a tire size (11/70 R22.5) different from the aforementioned tire size. As seen from results of FIG. 18 showing a change of maximum contact pressure, the optimum position of the peak T in the curved surface 13 is located between the two straight lines as mentioned above.

Figure 3:
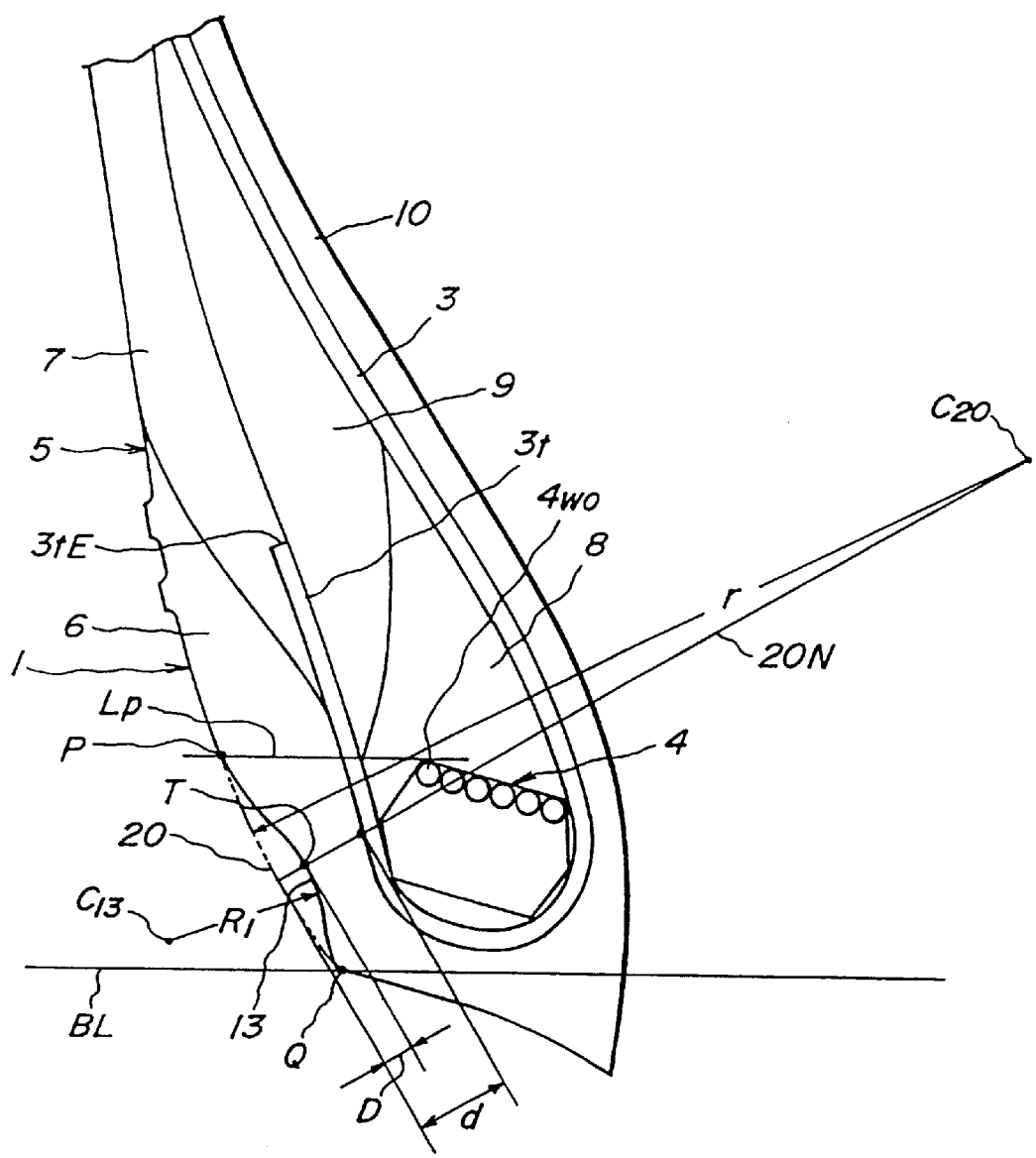
FIG. 3 is a diagrammatically section view illustrating details of an embodiment of the tire bead portion of FIG. 1.

Referring to FIGS. 1 and 3, it is adaptable in the invention that a radius of curvature $R_1$ in the arc segment having the peak T among the plural arc segments forming the concavedly curved surface 13 of the composite side-rubber 5 (rubber chafer 6) appeared at the section of the tire and a radius of curvature R mainly forming the curved line 21S of the flange 21F at the inner section contour of the rim 21 satisfy a relationship of $0.4 \times R \leq R_1 \leq 1.6 \times R$.

Figure 19:
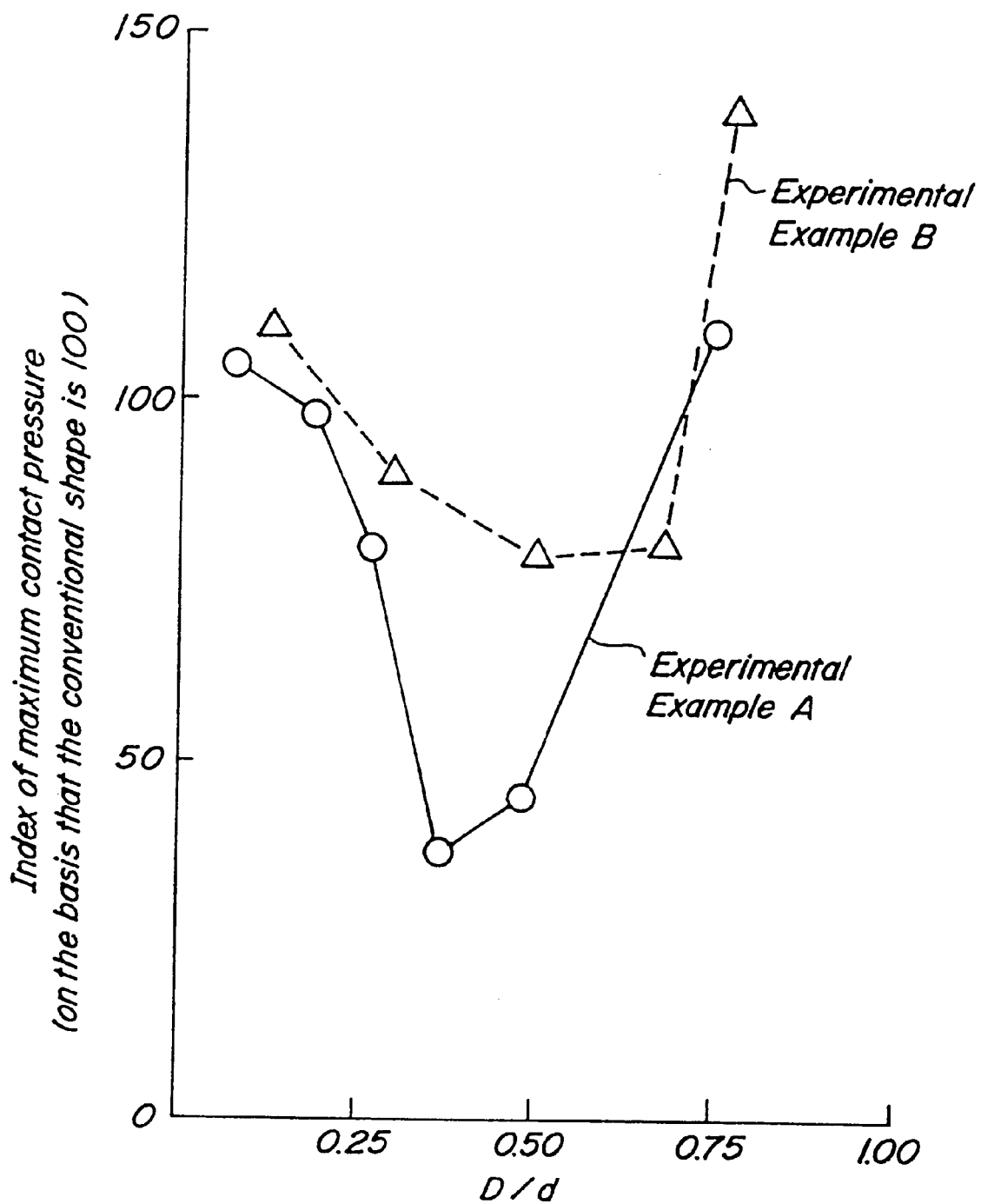
FIG. 19 is a graph showing a relation between distance ratio and maximum contact pressure in a bead portion engaged with a flange of a rim.
Figure 20:
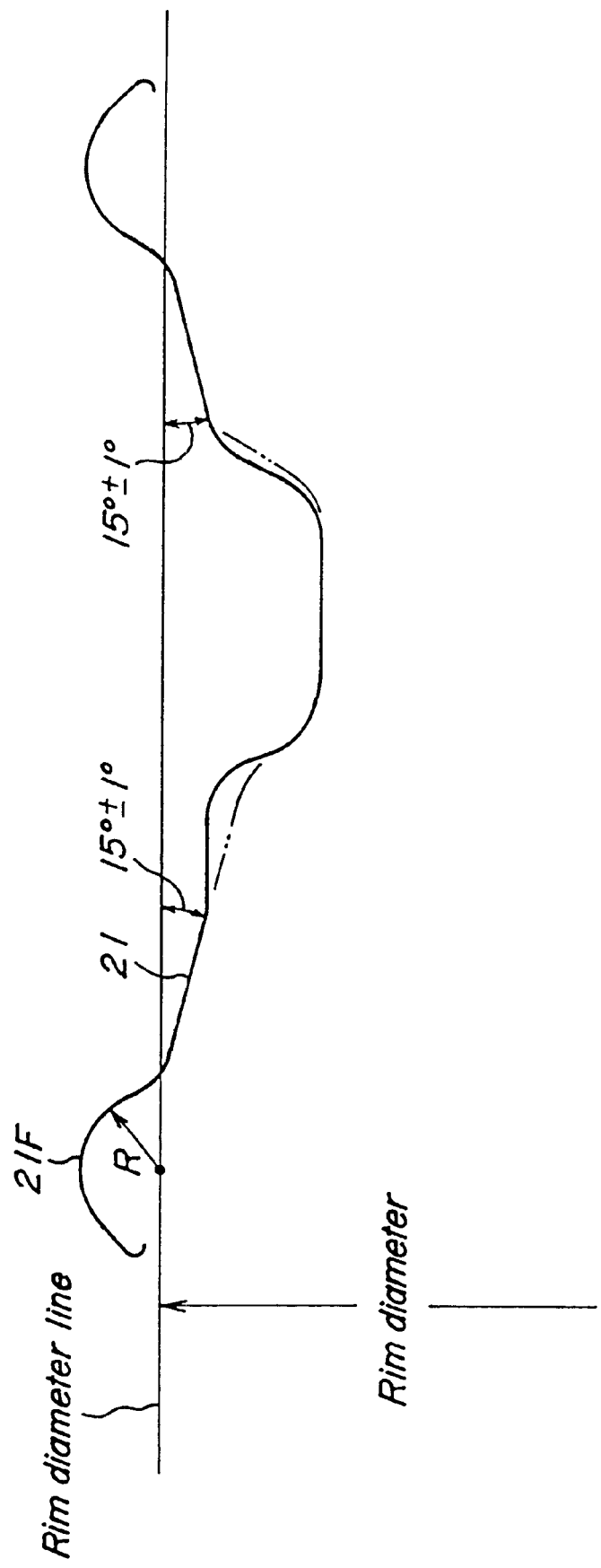
FIG. 20 is a diagrammatically section view of a 15° drop center rim.
Figure 21:
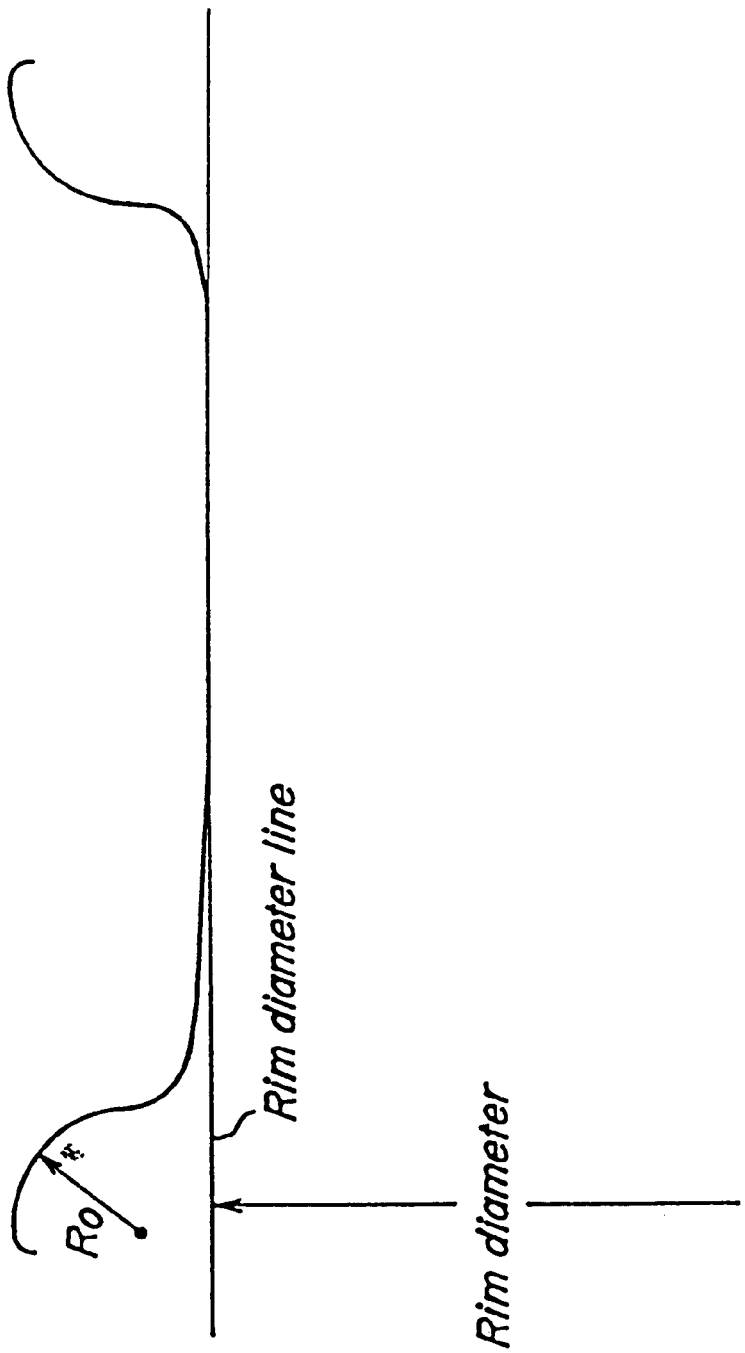
FIG. 21 is a diagrammatically section view of a width-wide flat bottom rim.
Figure 22:
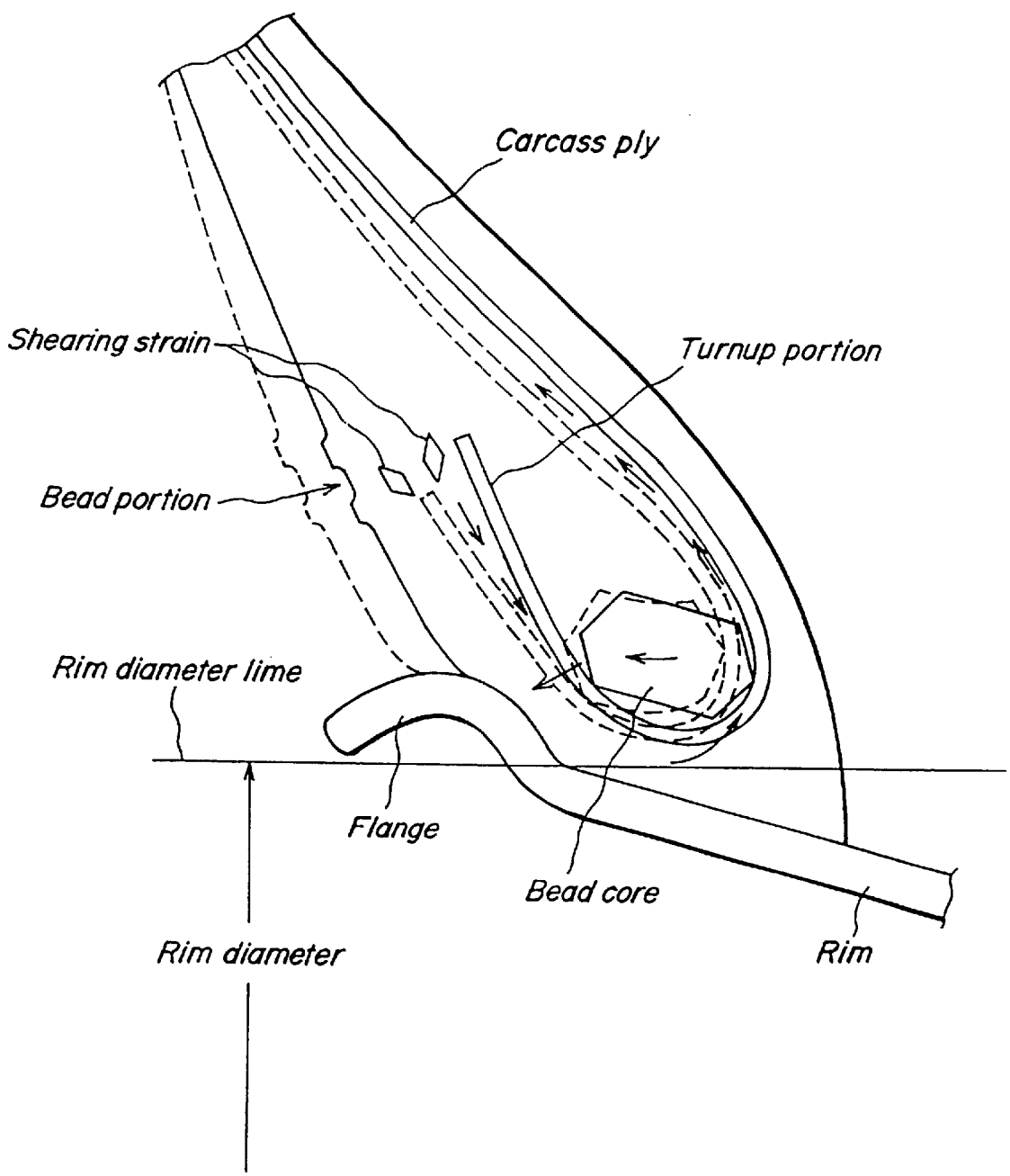
FIG. 22 is a diagrammatically section view of a bead portion mounted on a rim illustrating a creep deformation of the conventional tire.

First, there is hypothesized an arc 20 convexedly extending toward the outside of the tire at section of the tire and having a radius of curvature r (see FIG. 3) which is pictured to pass through a first intersect P between the first straight line Lp and an outer contour line of the bead portion 1 and a second intersect Q between the bead base line BL and a surface contour line of a small beveled round part in the bead heel portion perpendicular to the bead base line BL and smoothly connects to the outer contour line in the vicinity of the first intersect P. Referring to FIG. 3, a distance D between the peak T and the hypothetic arc 20 as measured on an extension of a line segment connecting a curvature center $C_{20}$ of the hypothetic arc 20 to the peak T or a normal line passing through the peak T toward the hypothetic arc 20 is preferably within a range of 22–70% of a distance d between the hypothetic arc 20 and a position of the turnup portion 3t of the 20 carcass ply located on the same normal line (or extension). This is confirmed from a fact that similar results are obtained by using T/L radial tires of Experimental Examples And B and Conventional Example having the two different tire sizes as previously mentioned. As seen from results of FIG. 19 showing an index of maximum contact pressure, the value of D/d when the index of maximum contact-pressure is less than 100 as compared with that of the conventional example is within a range of 0.22–0.70.

Figure 4:
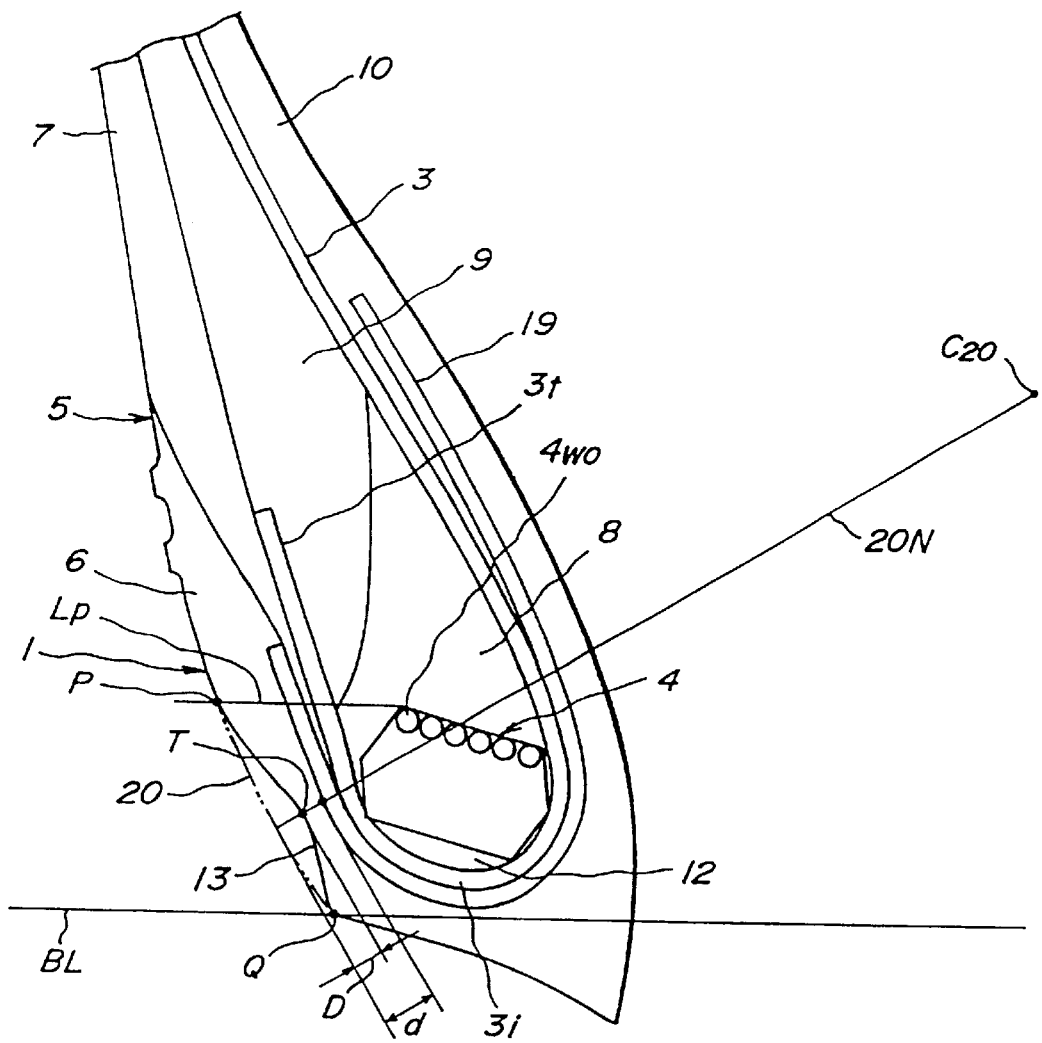
FIG. 4 is a diagrammatically section view illustrating details of a modified embodiment of the tire bead portion shown in FIG. 3.

The bead portion 1 shown in FIGS. 4–8 has a structure where one or more reinforcing cord layers, particularly reinforcing steel cord layers 19 (one cord layer in the illustrated embodiment) are provided on the carcass ply 3. The steel cords constituting the cord layer 19 are arranged at an inclination angle of 30–80° with respect to the radial direction in the vicinity of the bead core 4. In FIG. 4, the distance D between the hypothetic arc 20 and the peak T as measured on the extension of the line segment connecting the curvature center $C_{20}$ of the hypothetic arc 20 to the peak T is preferably within a range of 22–70% of the distance d between the hypothetic arc 20 and the outermost reinforcing steel cord layer as measured on the same extension.

Figure 5:
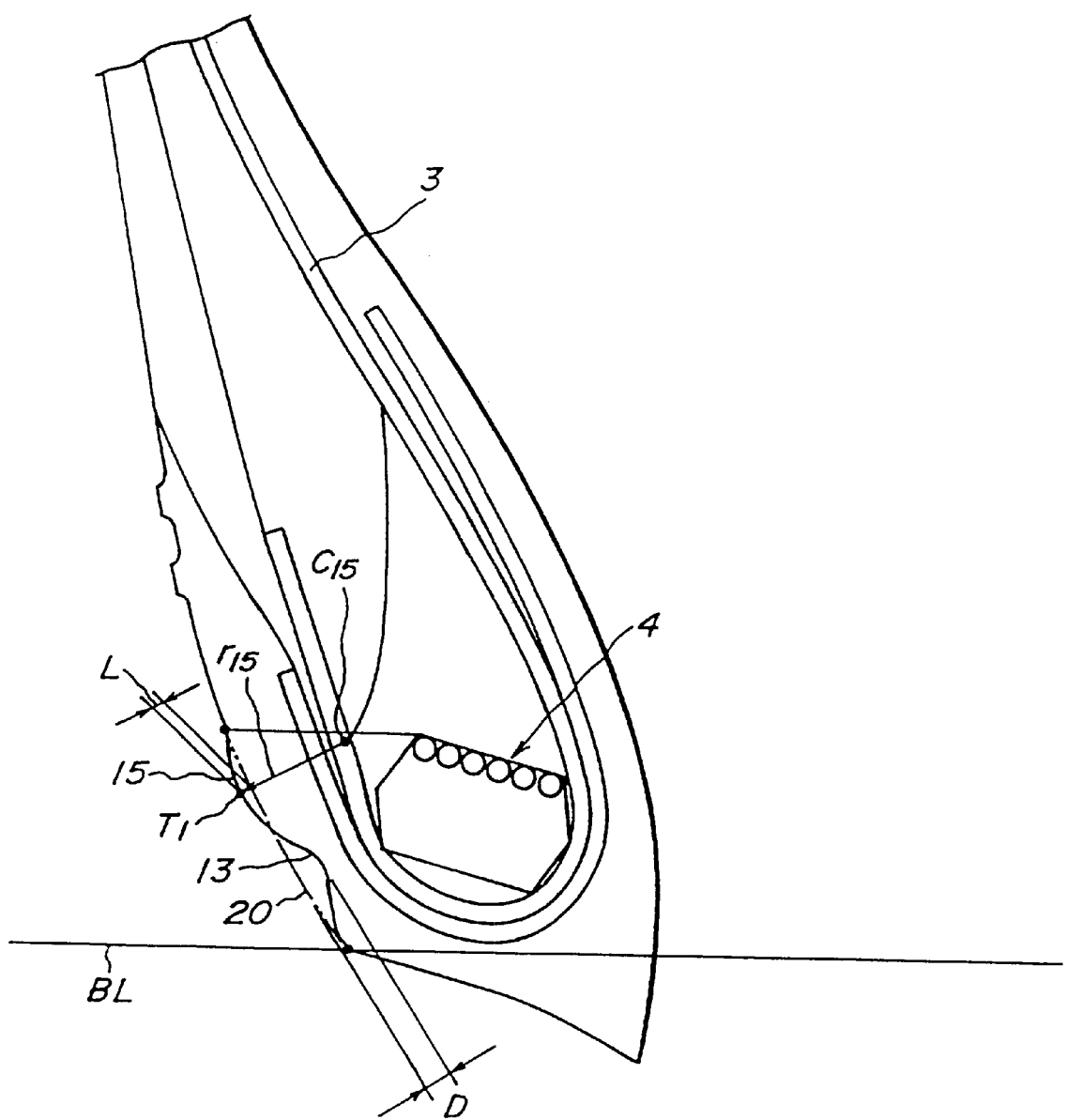
FIG. 5 is a diagrammatically section view illustrating details of another modified embodiment of the tire bead portion shown in FIG. 3.

In the embodiment of FIG. 5, a convex arc segment 15 projecting from the hypothetic arc 20 toward the outside of the tire and having a peak T1 is provided on the outer surface of the bead portion 1 at the outer side of the concavedly curved surface 13 of the composite side-rubber 5 (rubber chafer 6) in the radial direction to smoothly connect to the concavedly curved surface 13. Since the arc segment pictured by a radius of curvature $r_{15}$ from a center $C_{15}$ has the peak $T_1$, it is favorable that a distance L between the peak $T_1$ and the hypothetic arc 20 as measured on a normal line passing through the peak $T_1$ toward the hypothetic arc 20 is not more than 0.65 times of the above-defined distance D.

Figure 6:
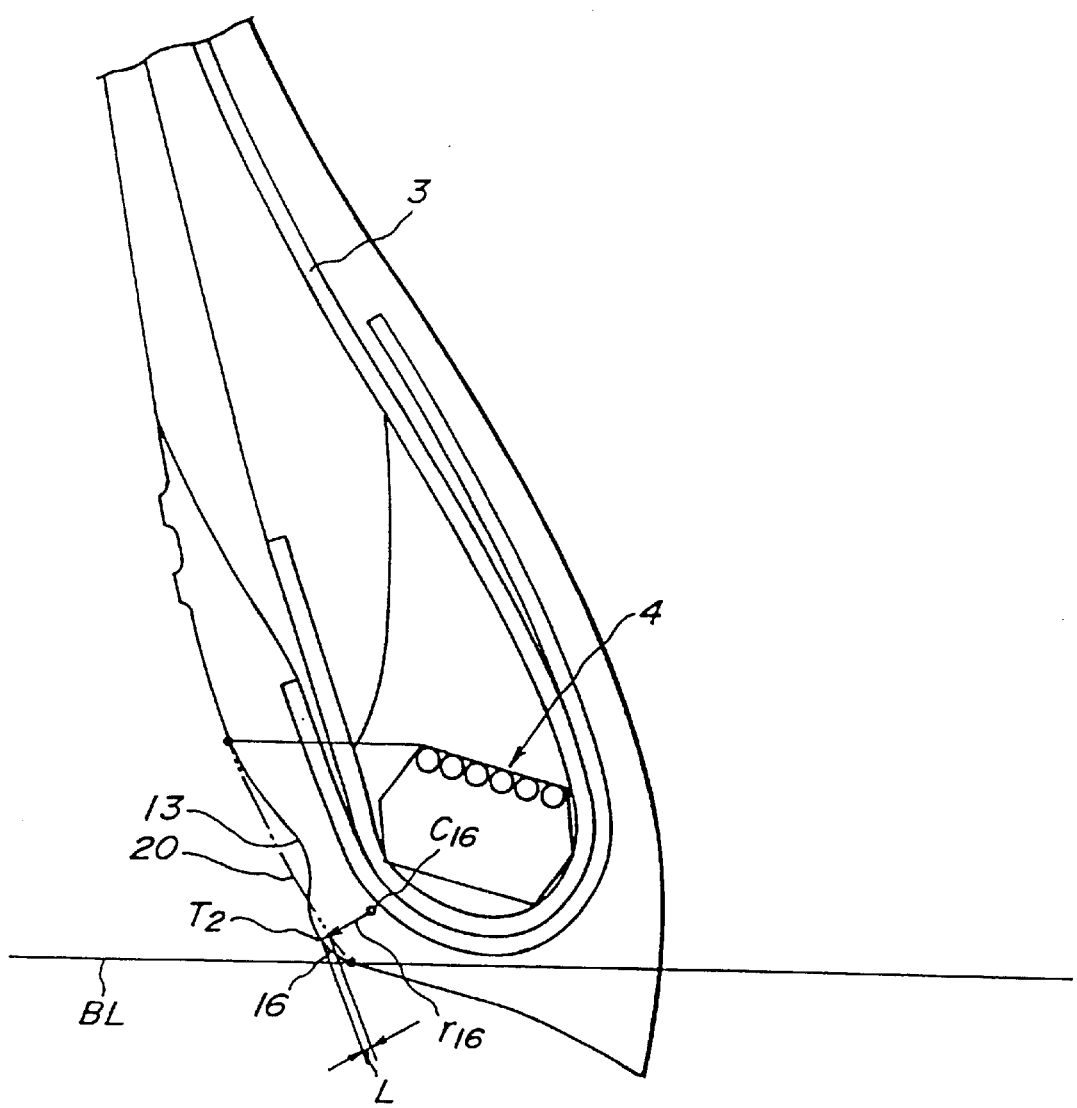
FIG. 6 is a diagrammatically section view illustrating details of a modified embodiment of the tire bead portion shown in FIG. 5.

In the embodiment of FIG. 6, a convex arc segment 16 projecting from the hypothetic arc 20 toward the outside of the tire and having a peak $T_2$ is provided on the outer surface of the bead portion 1 at the outer side of the concavedly curved surface 13 of the composite side-rubber 5 (rubber chafer 6) in the radial direction to smoothly connect to the concavedly curved surface 13. Since the arc segment pictured by a radius of curvature $r_{16}$ from a center $C_{16}$ has the peak $T_2$, it is favorable that a distance L between the peak $T_2$ and the hypothetic arc 20 as measured on a normal line passing through the peak $T_2$ toward the hypothetic arc 20 is not more than 0.65 times of the above-defined distance D. As a foundation, various experiments as Experimental Examples C and D are made by varying a ratio of distance L to distance D to obtain results as shown in Table 1 in which the contact pressure is represented by an index on the basis that the conventional example is 100.

TABLE 1

| L/D | Experimental Example C | Experimental Example C |
| --- | --- | --- |
| 0.05 | 84 | 78 |
| 0.20 | 93 | 88 |
| 0.60 | 96 | 94 |
| 0.70 | 115 | 119 |

Figure 7:
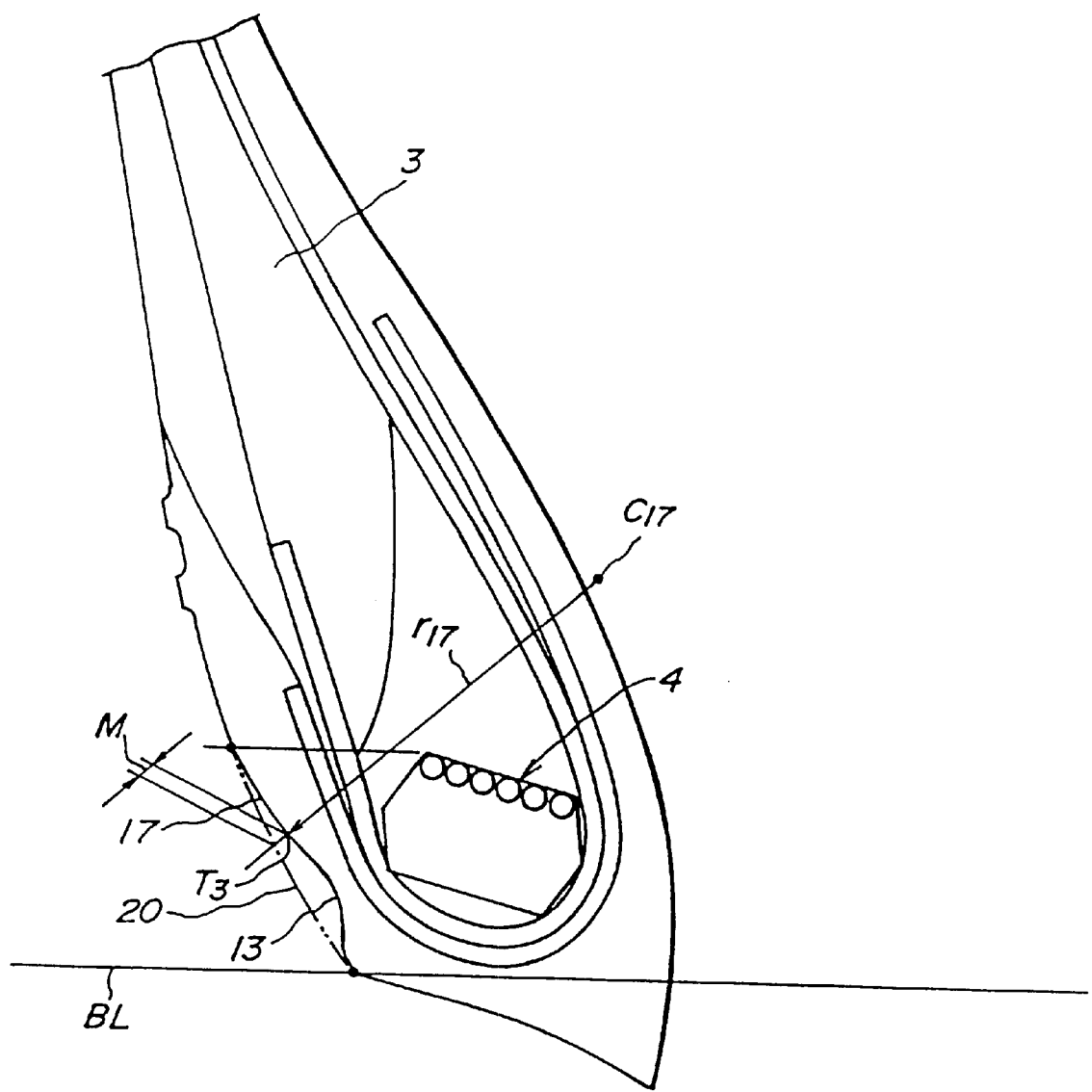
FIG. 7 is a diagrammatically section view illustrating details of the other modified embodiment of the tire bead portion shown in FIG. 3.

In the embodiment of FIG. 7, a convex arc segment 17 projecting inside the hypothetic arc 20 toward the outside of the tire and having a peak $T_3$ is provided on the outer surface of the bead portion 1 at the outer side of the concavedly curved surface 13 of the composite side-rubber 5 (rubber chafer 6) in the radial direction to smoothly connect to the concavedly curved surface 13. Since the arc segment pictured by a radius of curvature $r_{17}$ from a center $C_{17}$, has the peak $T_3$, it is favorable that a distance M between the peak $T_3$ and the hypothetic arc 20 as measured on a normal line passing through the peak $T_3$ toward the hypothetic arc 20 is within a range of 0.1–0.5 times of the above-defined distance D.

Figure 8:
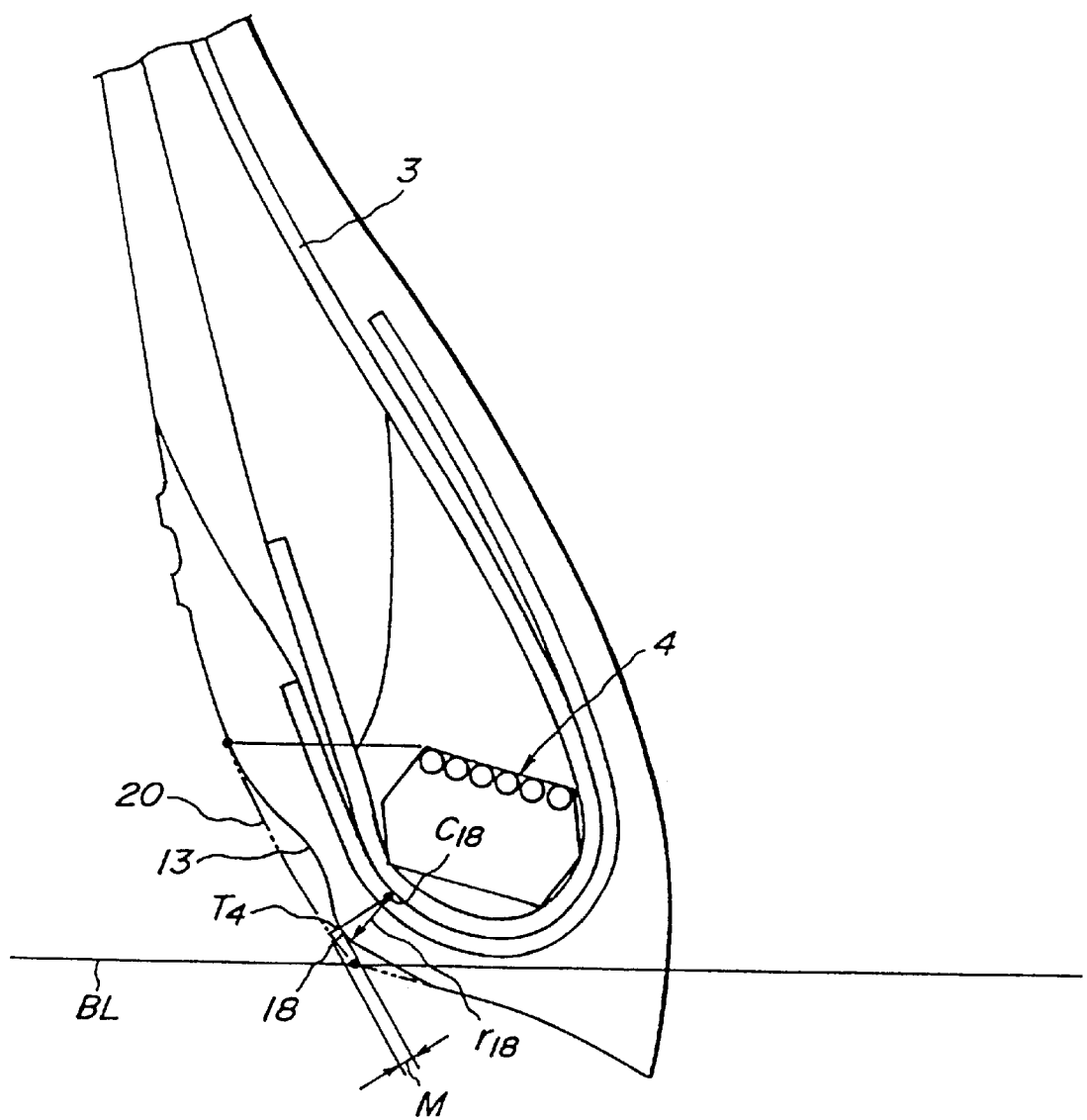
FIG. 8 is a diagrammatically section view illustrating details of a modified embodiment of the tire bead portion shown in FIG. 7.

In the embodiment of FIG. 8, a convex arc segment 18 projecting inside the hypothetic arc 20 toward the outside of the tire and having a peak $T_4$ is provided on the outer surface of the bead portion 1 at the outer side of the concavedly curved surface 13 of the composite side-rubber 5 (rubber chafer 6) in the radial direction to smoothly connect to the concavedly curved surface 13. Since the arc segment pictured by a radius of curvature $r_{18}$ from a center $C_{18}$ has the peak $T_4$ it is favorable that a distance M between the peak $T_4$ and the hypothetic arc 20 as measured on a normal line passing through the peak $T_4$ toward the hypothetic arc 20 is within a range of 0.1–0.5 times of the above-defined distance D.

Figure 9:
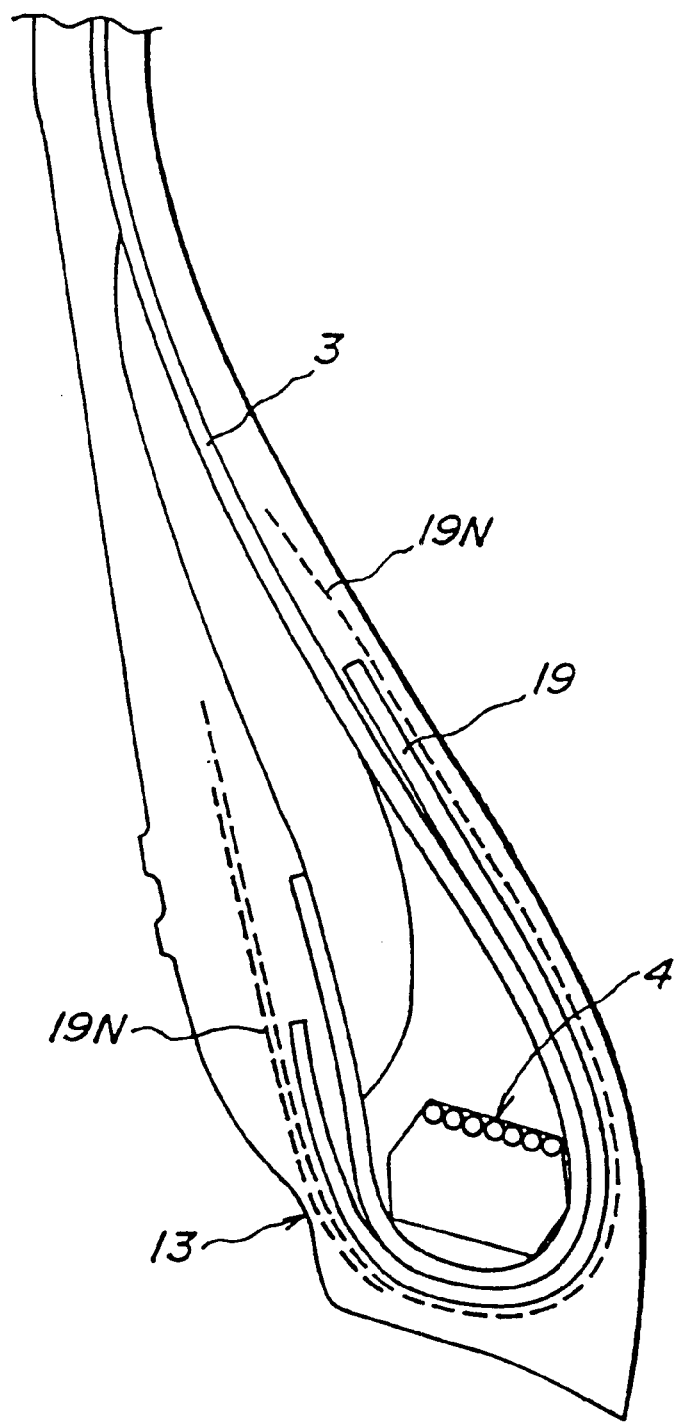
FIG. 9 is a diagrammatically section view illustrating details of another modified embodiment of the tire bead portion shown in FIG. 1.

The bead portion 1 shown in FIG. 9 has a structure that nylon cord layer 19N is arranged on the reinforcing steel cord layer 19 to form two layers at the outer region of the tire and one layer at the inner region of the tire as a bead portion reinforcing cord layer. For the other structure, the concavedly curved surface 13 is formed on the composite side-rubber as described on FIGS. 1 and 3–8 and further the convex arc segment 15-18 may be provided thereon. Moreover, the nylon cords are arranged at the same inclination angle as in the steel cords of the layer 19 with respect to the radial direction, provided that the nylon cords of the layer 19N adjacent to the layer 19 are crossed with the steel cords of the layer 19 and the nylon cords of the two layers 19N are crossed with each other.

The invention will be further described with respect to the group shown in FIGS. 10–15 below.

The bead portion 1 of FIG. 10 has the same structure as in FIG. 1 except the structure of the bead core 4 and the absence of the concavedly curved surface in the composite side rubber 5. FIG. 10 shows a state just before the complete fitting of the T/L radial tire to a rim 21 having a section profile shown by a solid line. In the tire of FIG. 10, at least an outer surface region of the bead core 4 among the members constituting the bead portion 1, i.e. the composite side-rubber 5, the turnup portion 3t and the bead core 4 has a curved envelop surface (envelop line segment) 4-13 concavedly directing toward the outside of the tire at a position opposite to the inner curved surface 21S of the slantly rising portion in the flange 21F of the rim 21.

In an outer envelop line for steel wire of the bead core 4, at least a central region of the above curved envelop surface 4-13 is comprised of an arc with a radius of curvature $R_2$ having a curvature center $C_{4-13}$ located on a perpendicular bisector HL of a line segment $L_{4-13}$ connecting both ends of the central region to each other. This arc may be extended over the entire curved envelop surface 4-13, or may be formed by forming each end portion of the curved envelop surface 4-13 with an arc having a radius of curvature different from the radius of curvature $R_2$.

The radius of curvature $R_2$ is a value satisfying a relationship of $0.7 \times R \leq R_2 \leq 1.2 \times R$ with respect to the radius of curvature R forming the inner curved surface 21S of the flange 21F at the section of the rim 21. Thus, it is effective to prevent the shape loss of the bead core 4.

The details of the section of the bead core 4 having the curved envelop surface 4-13 are shown in FIGS. 11 and 12. The bead core 4 shown in FIGS. 11 and 12 may be basically produced by the same method as described on the bead core 4 of FIG. 2. In this case, however, a region of the curved envelop surface 4-13 is formed in the outer envelop line of the bead core 4, so that the outer envelop line in the section of the bead core as a whole becomes a somewhat deformed hexagonal shape. In FIG. 11, the deformation is slight, so that the length of the curved envelop surface 4-13 is not so long, while the degree of the deformation in FIG. 12 becomes large as compared with the case of FIG. 11 and the length of the curved envelop surface 4-13 is sufficiently long. In any case, the use of the bead core 4 shown in FIGS. 11 and 12 may be determined in accordance with the tire application, use conditions and the like.

The production method of the bead core 4 having the curved envelop surface 4-13 is substantially the same as in the bead core 4 of FIG. 4, but the shaping device should be a two-split type or size-reducing type device having a concave sectional shape corresponding to an outer envelop line of a polygonal shape, a substantially hexagonal envelop line in the illustrated embodiment. The two-split type device has an unsymmetrical shape in that one of side faces in each of the concave shaping split molds is the curved envelop surface 4-13 shown in FIGS. 11 and 12 and the other side face thereof is a plain (straight line), while the the size-reducing type device is a monobloc shaping ring (size-reducible) having on both side surfaces a region of the curved envelop surface 4-13 and a region of the plain (straight line) in the shaping. After shaping, the uncured bead core 4 may be applied to the tire building as it is, or may be subjected to a precuring treatment when there is caused a fear of the shape losing in the bead core during the vulcanization of the uncured tire in a mold. Moreover, the innermost peripheral surface of the bead core 4 is naturally tapered at an inclination angle α of about 15° with respect to the straight line BLc parallel to the bead base line.

Figure 13:
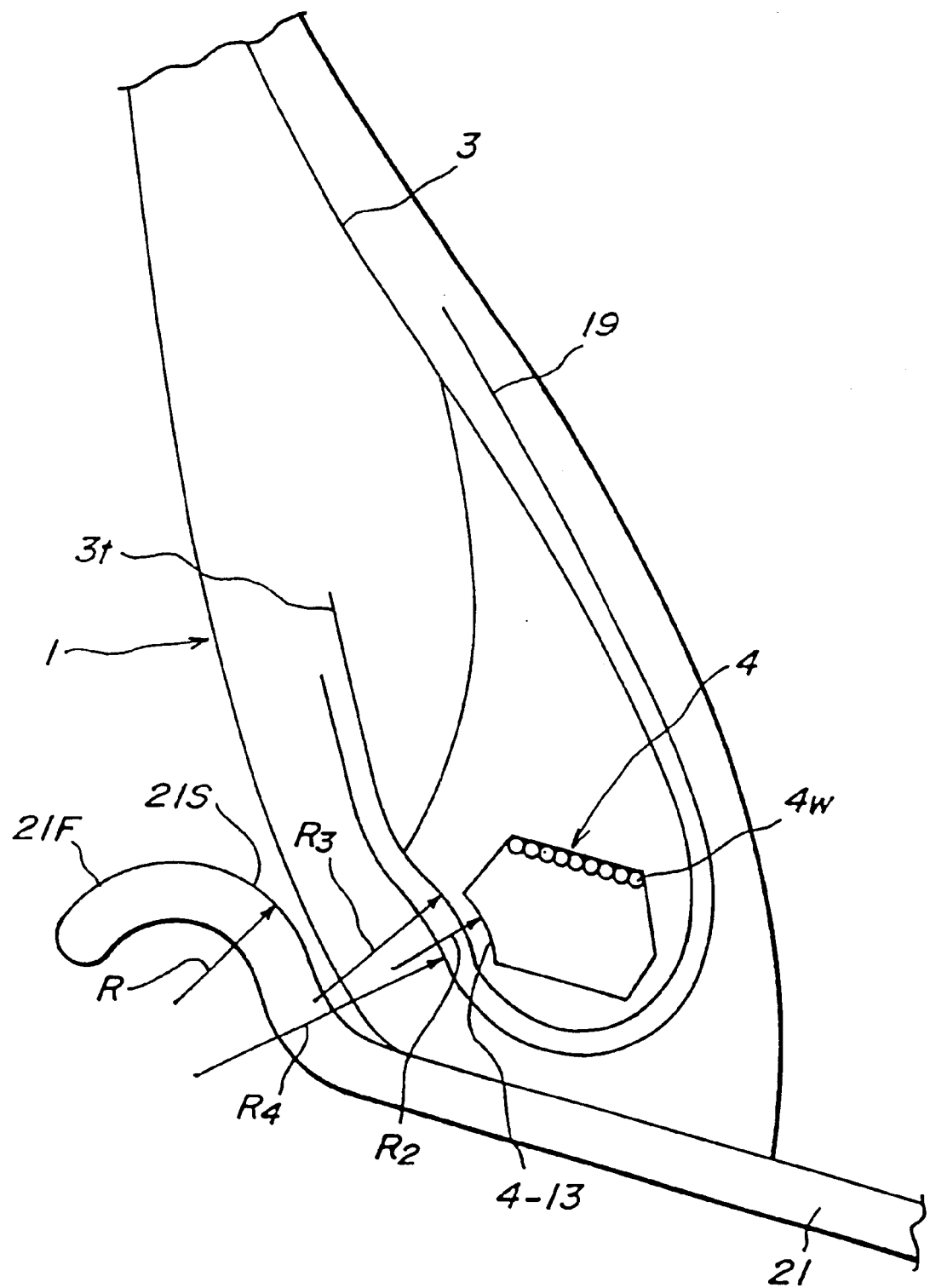
FIG. 13 is a diagrammatically section view illustrating details of a modified embodiment of the tire bead portion shown in FIG. 10.
Figure 14:
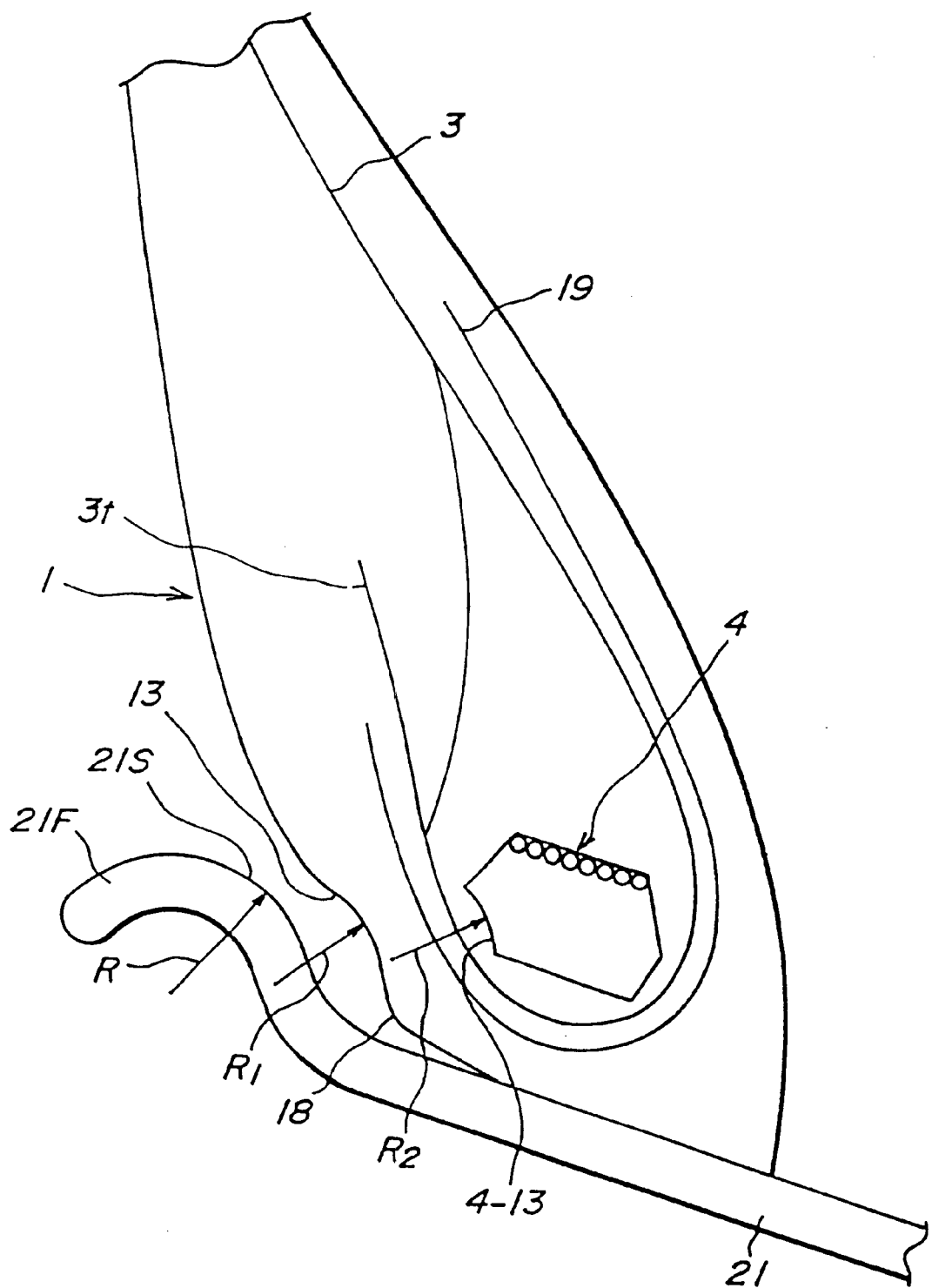
FIG. 14 is a diagrammatically section view illustrating details of another modified embodiment of the tire bead portion shown in FIG. 10.
Figure 15:
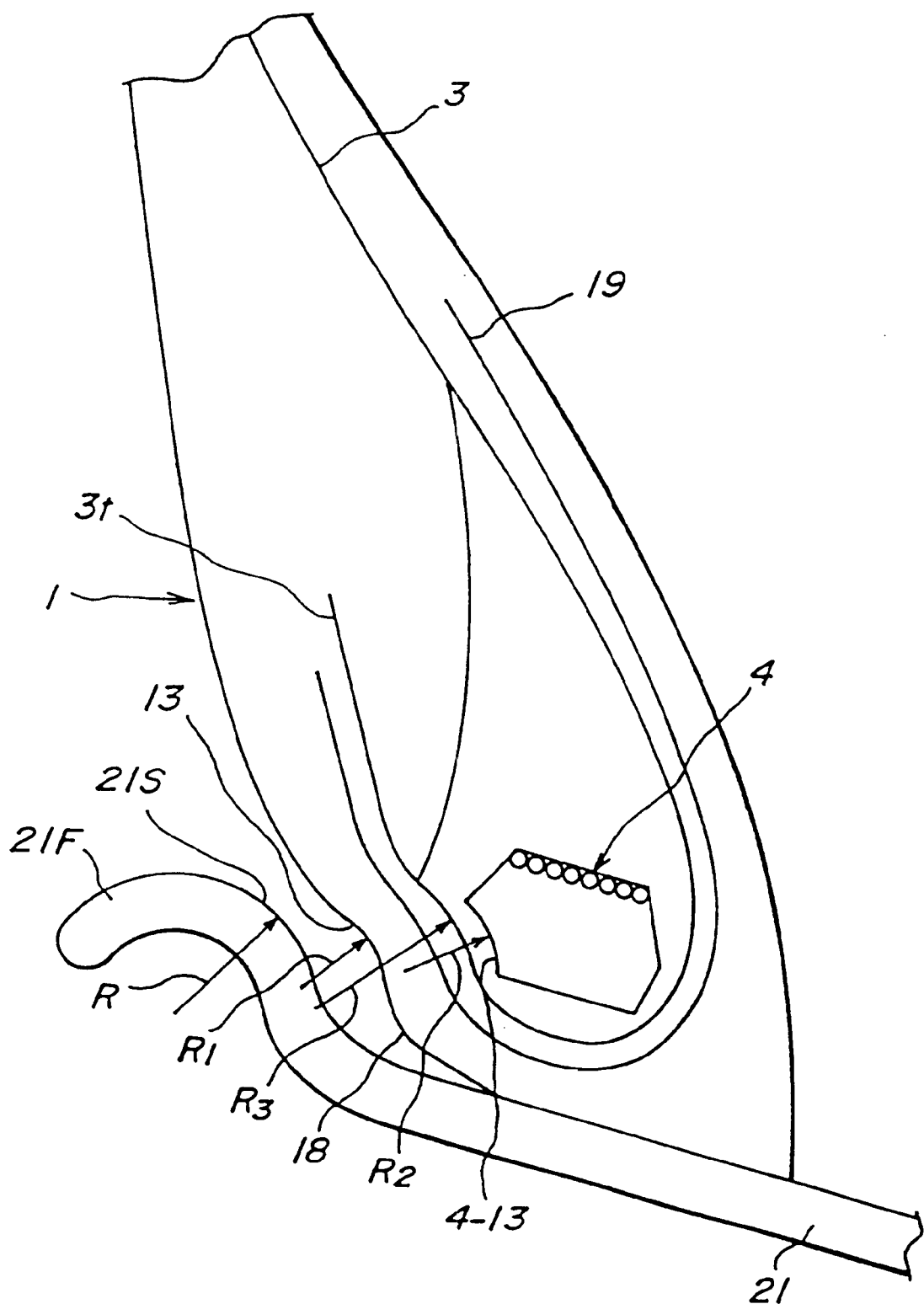
FIG. 15 is a diagrammatically section view illustrating details of the other modified embodiment of the tire bead portion shown in FIG. 10.

In FIGS. 13–15, the carcass ply 3 and the reinforcing steel cord layer 19 are simply represented by a single curved line, respectively. The tire shown in FIGS. 13–15 is provided with the bead portion 1 shown in FIG. 10 and the reinforcing steel cord layer 19. In the bead portion 1 of FIG. 13, each turnup portion 3t of the carcass ply 3 and the reinforcing steel cord layer 19 is comprised of one or more arc segments (arcs) having a curvature center located outside the tire at a position corresponding to the curved envelop surface 4-13 of the bead core 4.

In FIG. 13, a minimum radius of curvature $R_3$ among the radii of curvature in the arcs forming the turnup portion 3t is within a range of 0.75–1.2 times of the radius of curvature R in the flange 21F of the rim 21, while a minimum radius of curvature $R_4$ among radii of curvature in the arcs forming the reinforcing steel cord layer 19 satisfies relationships of $R_4 \leq R_3$ and $R4 \leq 1.65R$ with respect to the minimum radius of curvature $R_3$ and the radius of curvature R in the flange 21F of the rim 21.

The bead portion 1 shown in FIG. 14 has a structure having the concavedly curved surface 13 of the composite side-rubber 5 (rubber chafer 6) as previously mentioned and the curved envelop surface 4-13 of the bead core 4 shown in FIGS. 10–12. In this case, the radius of curvature $R_1$ of the curved surface 13, radius of curvature $R_2$ of the envelop surface 4-13 and radius of curvature R of the flange satisfy the relationships as previously mentioned.

The bead portion 1 shown in FIG. 15 has a structure having one or-more arc segments (arcs) having a curvature center located outside the tire at a position corresponding to the curved envelop surface 4-13 of the bead core 4 in each of the turnup portion 3t of the carcass ply 3 and the reinforcing steel cord layer 19 shown in FIG. 13, the concavedly curved surface 13 of the composite side-rubber 5 (rubber chafer 6) as previously mentioned and the curved envelop surface 4-13 of the bead core 4 shown in FIGS. 10–12. In this case, the radii of curvature $R_1$ to $R_4$ and radius of curvature R satisfy the relationships as previously mentioned.

As seen from the above, it is possible to adopt various combinations based on the descriptions on FIGS. 1–15 in the T/L radial tire according to the invention. Thus, the durability of the bead portion 1 can largely be improved to sufficiently achieve the object of the invention.

In order to ensure the improvement of the durability in the bead portion 1, the modulus at 100% elongation $E_1$ in the wrapping rubber for the bead core 4, modulus at 100% elongation $E_2$ in the hard stiffener rubber, modulus at 100% elongation $E_3$ in rubber portion of the composite side-rubber 5 (rubber chafer 6) forming the concavedly curved surface 13 and modulus at 100% elongation E4 in the coating rubber for the steel wire 4w constituting the bead core 4 are desirable to satisfy the following relationships:

$0.75 \times E_2 \leq E_1 \leq 1.20 \times E_2$ $0.68 \times E_2 \leq E_3 \leq 1.15 \times E_2$ $0.45 \times E_2 \leq E_4$ These relationships are defined by measuring shearing strain acting to the turnup end portion 3tE through 10 cases having given values of ratios $E_1/E_2$, $E_3/E_2$ and $E_4/E_2$. The values of these ratios and the index of shearing strain on the basis that the conventional tire is 100 are shown in Table 2, in which the smaller the index value, the better the property.

TABLE 2

| Case No. | Value of $E_1/E_2$ | Value of $E_3/E_2$ | Value of $E_4/E_2$ | Index of shearing strain |
| --- | --- | --- | --- | --- |
| 1 | 0.92 | 0.83 | 0.45 | 34 |
| 2 | 0.83 | 0.83 | 0.45 | 70 |
| 3 | 0.75 | 0.83 | 0.45 | 95 |
| 4 | 1.05 | 0.83 | 0.45 | 38 |
| 5 | 1.25 | 0.83 | 0.45 | 102 |

TABLE 2-continued

| Case No. | Value of $E_1/E_2$ | Value of $E_3/E_2$ | Value of $E_4/E_2$ | Index of shearing strain |
|---|---|---|---|---|
| 6 | 0.92 | 0.75 | 0.45 | 45 |
| 7 | 0.92 | 0.68 | 0.45 | 88 |
| 8 | 0.75 | 0.68 | 0.45 | 97 |
| 9 | 0.83 | 0.83 | 0.25 | 105 |
| 10 | 0.83 | 0.83 | 0.40 | 101 |

The following examples are given in illustration of the invention and are not intended as limitations thereof.

The T/L radial tire for truck and bus used in these examples has a tire size of 11R22.5 and a structure as shown in FIGS. 1–15, which is mounted on an approved rim 21 having a rim size of 22.5×8.25 and a radius of curvature R of 12.7 mm at an arc section of an inner curved surface 21S of a flange 21F. The carcass ply 3 is a single ply containing radially arranged steel cords, and the belt is comprised of four steel cord cross belt layers. For the comparison with these examples, there is provided a conventional example having the same size and construction as in the above example except that the bead portion has actually the outer surface corresponding to the hypothetic arc 20.

For convenience sake, the tires of the above examples are divided into a first example group shown in FIGS. 1–9 and a second example group shown in FIGS. 10–15. The bead core 4 of the first example group is a hexagonal bead core shown in FIG. 2 in which the steel wire has a diameter of 1.55 mm and the number of windings, (number of wires appearing in the section) is 65 turns, while as the bead core 4 of the second example group, Example 8 has a sectional shape shown in FIG. 11 in which the diameter of the steel wire is 1.55 mm and the number of windings is 65 turns, and Examples 9–11 have a sectional shape shown in FIG. 12 in which the diameter of the steel wire is 1.55 mm and the number of windings is 71 turns.

In the first example group, there are provided tires of Examples 1–7 having various different values of ratios $R_1/R$, D/d, L/D and M/D and the conventional tire. These values are shown in Table 3 together with respective figure number and values of ratios $E_1/E_2$, $E_3/E_2$ and $E_4/E_2$.

TABLE 3

| Items | Conventional Example FIG. 23 | Example 1 FIG. 3 | 2 FIG. 4 | 3 FIG. 5 | 4 FIG. 6 | 5 FIG. 7 | 6 FIG. 8 | 7 FIG. 9 |
|---|---|---|---|---|---|---|---|---|
| $R_1/R$ | — | 1.18 | 1.20 | 0.49 | 0.63 | 1.02 | 0.98 | 0.90 |
| D/d | — | 0.33 | 0.56 | 0.50 | 0.40 | 0.57 | 0.54 | 0.66 |
| L/D | — | — | — | 0.23 | 0.38 | — | — | — |
| M/D | — | 0.26 | 0.25 | — | 0.34 | 0.28 | 0.46 | 0.27 |
| $E_1/E_2$ | 0.92 | 0.92 | 0.92 | 0.92 | 0.92 | 0.83 | 0.83 | 0.92 |
| $E_3/E_2$ | 0.83 | 0.83 | 0.83 | 0.75 | 0.75 | 0.83 | 0.83 | 0.75 |
| $E_4/E_2$ | 0.45 | 0.45 | 0.45 | 0.45 | 0.45 | 0.45 | 0.45 | 0.45 |
| Index of long run on drum | 100 | 133 | 154 | 122 | 120 | 117 | 121 | 115 |
| Index of crack length | 100 | 35 | 30 | 31 | 56 | 45 | 73 | 52 |
| Index of CP | 100 | 110 | 114 | 109 | 108 | 112 | 110 | 105 |

In the second example group, there are provided tires of Examples 8–11 having various different values of ratios $R_2/R$, $R_3/R$, $R_4/R_3$ and $R_1/R$ and the conventional tire. These values are shown in Table 4 together with respective figure number and values of ratios $E_1/E_2$, $E_3/E_2$ and $E_4/E_2$.

TABLE 4

| Items | Conventional Example FIG. 23 | Example 8 FIG. 10 | 9 FIG. 13 | 10 FIG. 14 | 11 FIG. 15 |
|---|---|---|---|---|---|
| $R_2/R$ | — | 0.93 | 0.98 | 0.91 | 0.97 |
| $R_3/R$ | — | — | 1.05 | — | 1.03 |
| $R_4/R_3$ | — | — | 1.57 | — | 1.58 |
| $R_1/R$ | — | — | — | 0.90 | 0.90 |
| $E_1/E_2$ | 0.92 | 1.05 | 1.05 | 0.92 | 0.92 |
| $E_3/E_2$ | 0.75 | 0.83 | 0.83 | 0.75 | 0.75 |
| $E_4/E_2$ | 0.45 | 0.45 | 0.45 | 0.45 | 0.45 |
| Index of long run on drum | 100 | 110 | 115 | 127 | 135 |
| Index of crack length | 100 | 88 | 80 | 42 | 33 |
| Index of CP | 100 | 103 | 102 | 105 | 109 |

In order to prove the effect of tire according to the invention, each of the first and second example group tires and the conventional tire is mounted onto the approved rim and inflated under an internal pressure of 7.0 kgf/cm². Thereafter, such a tire is subjected to a long run test on a drum under conditions that the tire is run at a speed of 60 km/h under a loading of 5000 kgf until trouble is caused in the bead portion, while the tire is actually run on road over a distance of 100,000 km to measure a crack length created at the turnup end portion 3tE. The test results are also shown in Tables 3 and 4, in which a long run index on drum and an index of crack length are evaluated on the basis that the conventional tire is 100. The larger the index value, the better the result on the long run test, while the smaller the index value, the shorter the crack length.

A measure for determining the degree of creep deformation is steering stability of the tire frequently issued in the conventional tire. In this connection, the tire is actually run on road over a distance of 20,000 km, during which a cornering power is measured with respect to the tire creating any creep deformation. The measured results are also shown in Tables 3 and 4 in which the cornering power (CP) is represented by an index on the basis that the conventional tire is 100. The larger the index value, the better the cornering power.

As seen from the results of Tables 3 and 4, when the tires of the examples according to the invention are compared with the conventional tire in the test of long run on drum, the service life of the tire until the occurrence of trouble in the bead portion or separation failure from the turnup end portion becomes longer and hence the durability of the bead portion is largely improved. Even in the actual running test, the crack length is considerably short in the tires of the examples, from which it is apparent that the durability of the bead portion is improved in the practical use. Further, the index value of the cornering power is considerably large as compared with that of the conventional tire, from which it is proved to prevent the degradation of the steering stability and hence the creep deformation.

As mentioned above, according to the invention, there can be provided pneumatic radial tires for truck and bus mounted to 15° drop center rim capable of attaining the weight reduction while controlling the excessively volume increase of the bead portion and not requiring the extra and additional arrangement of the bead portion reinforcing cord layer. The temperature rise inside the bead portion is controlled during the running under heavy loading as far as possible to maintain adequate arrangement and shape of cord layers inclusive of a carcass line in the bead portion and properly control the creep deformation of the bead portion to thereby considerably improve the durability of the bead portion in connection with the cracking and separation at the turnup end portion of the carcass ply and the end portion of the reinforcing cord layer and also maintain the excellent steering stability.

What is claimed is:

1. A pneumatic radial tire for trucks and buses mounted on an approved 15° drop center rim comprising a pair of bead portions, a tread portion, at least one carcass ply extending between bead cores embedded one in each bead portion so as to reinforce these portions the at least one carcass ply being reinforced with cords radially arranged therein and wound around the bead cores from the inside of the tire toward the outside thereof to form a turnup portion in each bead portion and a main body therebetween, each of said bead cores being a wound laminate of steel wire having a round or polygonal shape in cross-section, a belt superimposed on an outer periphery of the at least one carcass ply to reinforce the tread portion and comprised of two or more cross steel cord layers and a composite side-rubber extending from a bead base of each bead portion through an outside of the bead portion to a tread rubber of the tread portion and consisting of a rubber chafer and a sidewall rubber, wherein an outer surface portion of at least the composite side-rubber among members constituting each bead portion of the tire has a curved shape concavedly directed toward the outside of the tire at a region opposite to an inner curved surface of a slantly rising portion in each flange of the approved rim, and both the composite side-rubber and each bead core are provided with the curved surfaces concavedly directed toward the outside of the tire on the outer surface portion of the composite side-rubber and the envelope surface of the bead core opposite to the inner curved surface of the slantly rising portion in each flange of the approved rim.

* * * * *